United States Patent [19]

Sato et al.

[11] Patent Number: 5,078,915
[45] Date of Patent: Jan. 7, 1992

[54] COATING LIQUIDS FOR FORMING CONDUCTIVE COATINGS

[75] Inventors: Goro Sato, Fukuoka; Michio Komatsu, Tokyo; Toshiharu Hirai; Yoneji Abe, both of Fukuoka; Keiichi Mihara, Chiba, all of Japan

[73] Assignees: Catalysts & Chemicals Industries Co., Ltd.; Asahi Glass Company, both of Tokyo, Japan

[21] Appl. No.: 298,607

[22] PCT Filed: Feb. 9, 1988

[86] PCT No.: PCT/JP88/00122
   § 371 Date: Oct. 11, 1988
   § 102(e) Date: Oct. 11, 1988

[87] PCT Pub. No.: WO88/06331
   PCT Pub. Date: Aug. 25, 1988

[30] Foreign Application Priority Data

Feb. 10, 1987 [JP] Japan ................................. 62-27289
Aug. 25, 1987 [JP] Japan ................................. 62-211096

[51] Int. Cl.$^5$ ............................................. H01B 1/06
[52] U.S. Cl. ................................. 252/518; 252/501.1; 252/520

[58] Field of Search ............... 252/518, 501.1, 520; 106/1.22, 1.25

[56] References Cited

U.S. PATENT DOCUMENTS 5,009,708  4/1991  Grünwald et al. .................... 252/520

Primary Examiner—Josephine Barr
Attorney, Agent, or Firm—Wenderoth, Lind & Ponack

[57] ABSTRACT

In accordance with the present invention, there are provided coating liquids for forming conductive coatings, which comprise (i) a zirconium oxysalt, (ii) a conductive substance and, if necessary, (iii) at least one member selected from non-sedimentary silica dispersion and silicon alkoxide or its derivative. The coating liquids, when coated on substrates, form thereon transparent conductive coatings which are excellent in transparency, scratch resistance, permanence properties and adhesion to the substrates and, moreover, excellent in antistatic effect. In particular, when the coating liquids for forming conductive coatings mentioned above are coated by the spray method on appropriate substrates followed by drying and/or heating, there are obtained face-plates for display devices, which have excellent regular reflection reducing effect (non-glare) and antistatic effect.

5 Claims, 1 Drawing Sheet

COATING LIQUIDS FOR FORMING CONDUCTIVE COATINGS

FIELD OF THE INVENTION

This invention relates to coating liquids for forming conductive coatings and more particularly to coating liquids capable of forming on substrates such as glass, plastics, etc. transparent conductive coatings excellent in scratch resistance as well as in adhesion to the substrates.

In other aspects, the invention relates to glass or plastic substrates provided on the surface thereof with transparent conductive-coatings formed by using the abovementioned coating liquids, and particularly to display devices having front panels provided on the surface thereof with said transparent conductive coatings.

BACKGROUND OF THE INVENTION

Since glass or plastics which are used as transparent substrates of varied types including face-plates for Cathode ray tube (CRT), liquid crystal display (LCD), etc. are insulating materials, the surface thereof is liable to static electrification and hence the substrate surface tends to attract dusts or the like. Furthermore, in electrodisplay devices such as LCD, etc., miss-performance is sometimes caused by the presence of static electricity. For solving such problems as referred to above, attempts have often been made to prevent such substrates as glass, plastics, etc. from their being electrostatically charged by virtue of imparting electrical conductivity to the surface thereof.

In order to impart electrical conductivity to substrates, metallic thin films or conductive inorganic oxide coatings are deposited on the surface of substrate by the vapor phase method such as CVD method, PVD method and vapor deposition method, etc. In an attempt to impart electrical conductivity to the substrate surface by the vapor phase method, however, there are such problems that vacuum deposition apparatuses are required therefor, and that a surface area or shape of the substrate on which a desired coating is formed is restricted by the size of said apparatuses to be employed.

In light of the above problems, a process for imparting electrical conductivity to substrates has been proposed, which process comprises coating the substrate on the surface thereof with conductive coating materials obtained by dispersing conductive substances in binder resins.

Where an attempt was made to form conductive coatings on substrates by using conductive coating materials obtained by dispersing conductive substances in binder resins such as acrylic resins, butyral resins, vinyl chloride/vinyl acetate copolymer resins, etc., however, there were such serious problems that the conductive coatings formed thereby are found poor in transparency, scratch resistance, solvent resistance or in adhesion to the substrates, though said conductive coatings are excellent sufficiently in electrical conductivity.

Under such circumstances, there has earnestly been desired an advent of coating liquids for forming conductive coatings which are excellent in scratch resistance, solvent resistance and in adhesion to substrates as well as transparency.

Apart from the purpose of forming conductive coatings on substrates, however, Japanese Patent L-O-P Publin. No. 100943/1982 discloses silicon oxide coatings containing 1-30 mol % of zirconium oxide with the view of protecting the substrate surface and inhibiting reflection therefrom. In this publication, it is stated that in the zirconium oxide-silicon oxide coatings there are used, as the zirconium compounds, zirconium chloride such as $ZrCl_2$, $ZrCl_3$ or $ZrCl_4$; zirconium nitrate such as $Zr(NO_3)_4 \odot 5H_2O$; zirconium alkoxides and zirconium diketonates.

However, when an attempt is made to form the zirconium oxide-silicon oxide coatings by using coating liquids containing zirconium chloride, zirconium nitrate, zirconium alkoxide or zirconium diketonate and silicon alkoxide, it has been found by the present inventors that there is such a serious problem that because of instability in water of zirconium chloride and zirconium nitrate, the coating liquids containing the same cannot be preserved over a long period of time and have a short potlife. Moreover, even if zirconium oxide-silicon oxide coatings were formed by the use of the above-mentioned coating liquids containing zirconium chloride and the like, it was still necessary to heat the resultant coatings at a temperature of at least 450° C. Moreover, the coating liquids as described above involved such a problem that said coating liquids must be adjusted to pH 2-6 by a fresh addition thereto of a mineral acid such as hydrochloric acid at the time when silicon alkoxides contained therein is hydrolyzed.

On one hand, face-plates of display devices are required in some cases to have a specular reflection reducing effect (hereinafter called non-glare) in order to inhibit glaring of said face-plates, in addition to their antistatic effect. In order to impart non-glare and antistatic effect to face-plates of display devices, a process designed for the purpose intended is disclosed, for example, in Japanese Patent L-O-P Publin. No. 16452/1986, wherein the face-plate composed of glass or plastics is previously heated, and a collodial solution of silicon compound such as partially hydrolyzed silicic acid ester, a solution of reactive silicon compound such as silicon tetrachloride, or a solution prepared by mixing the above-mentioned solution with a water-soluble compound of inorganic metal such as platinum, gold, palladium, tin or the like is sprayed over said face-plate to form thereon a finely irregular coating, followed by drying and heating.

Further, a process for forming a coating layer on a face-plate of Braun tube is also disclosed, for example, in Japanese Utility Model L-O-P Publn. No. 168951/1984, wherein tin oxide or indium oxide and silicon oxide are mixed or laminated by the vacuum deposition or dip method to form the coating layer on the face-plate.

In face-plate of display devices processed by the above-mentioned processes, however, non-glare attained was found insufficient, antistatic effect expected varied depending on ambient temperature and humidity, and under certain circumstances resolving power of the display devices came to decrease by the presence of the coating formed on the face-plate thereon. Further, the finely irregular coatings as formed were weak in adhesion to the face-plate and easily peeled off therefrom, were liable to scratching as being low in mechanical strength, and tended to peel off or elute as being lacking in permanence properties such as acid resistance, alkali resistance, resistance to saline solutions and to water, thus no non-glare and antistatic effect as expected could be maintained over a long period of time.

The present invention is intended to solve such problems associated with the prior art as mentioned above, and an object of the invention is to provide coating liquids for forming conductive coatings, said coating liquids being capable of forming on substrates such as glass, plastics, etc. the conductive coatings excellent in scratch resistance, permanence properties and adhesion to the substrates as well as in transparency and, at the same time, which are capable of being preserved with excellent stability over a long period of time.

A further object of the present invention is to provide glass or plastic substrates provided with transparent conductive coatings formed by the use of such coating liquids as mentioned above, said conductive coatings being excellent in transparency, scratch resistance, permanence properties, adhesion to the substrates and antistatic effect, or glass or plastic substrates provided likewise with transparent conductive coatings having non-glare in addition to the abovementioned functions. Another object of the present invention is to provide display devices having face-plates provided with transparent conductive coatings having the above-mentioned functions.

DISCLOSURE OF THE INVENTION

The first coating liquid for forming conductive coating of the present invention is characterized in that a zirconium oxysalt and a conductive substance are homogeneously dissolved or dispersed in a mixed solvent comprising water, an inorganic solvent and a stabilizer.

The second coating liquid for forming conductive coating of the present invention is characterized in that a zirconium oxysalt, a non-sedimentary silica and a conductive substance are homogeneously dissolved or dispersed in a mixed solvent comprising water, an organic solvent and a stabilizer.

The third coating liquid for forming conductive coating of the present invention is characterized in that a zirconium oxysalt, silicon alkoxide or its derivative and a conductive substance are homogeneously dissolved or dispersed in a mixed solvent comprising water and an organic solvent.

The fourth coating liquid for forming conductive coating of the present invention is characterized in that a zirconium oxysalt, silicon alkoxide or its derivative, a non-sedimentary silica and a conductive substance are homogeneously dissolved or dispersed in a mixed solvent comprising water, an organic solvent and a stabilizer.

The fifth coating liquid for forming conductive coating of the present invention is characterized in that diacetylacetonato-dialkoxide zirconium, a partial hydrolysate of silicon alkoxide and a conductive substance are homogeneously dissolved or dispersed in a mixed solvent comprising water and an organic solvent.

The substrates of the present invention, on which transparent conductive coatings have been formed, are characterized by having a total light transmission of at least 80%, a haze of less than 10%, a surface resistivity of from $10^3$ to $10^{11} \Omega /$, and a glossiness of less than 190% as measured at an angle of 60° in accordance with the glossiness measuring method stipulated in JIS K 7105-81.

The display device of the present invention, in which a transparent conductive coating has been formed on the surface of a face-plate, is characterized in that the transparent conductive coating is composed of zirconium oxide, silicon oxide and a conductive substance, and the face-plate, on the surface of which said transparent conductive coating has been formed, has a glossiness of 30-100% as measured at an angle of 60° in accordance with the glossiness measuring method stipulated in JIS K 7105-81, a resolving power of at least 50 bars/cm, and a surface resistivity of $10^3$-$10^{11} \Omega/\square$.

The first process for manufacturing the display device of the present invention is characterized in that any one of the above-mentioned second to fifth coating liquids for forming conductive coatings of the present invention is coated by the spray method on a face-plate of said display device previously heated to and maintained at 40°-90° C., followed by drying and/or heating.

The second process for manufacturing the display device of the present invention is characterized in that any one of the above-mentioned coating liquids for forming conductive coatings is coated likewise on a face-plate of said display device, dried and/or heated, and a coating liquid containing a transparent protective component is coated by the spray method on the face-plated heated to and maintained at 40°-90° C., followed by drying and/or heating.

BEST MODE FOR PRACTICE OF THE INVENTION

Figure 1:
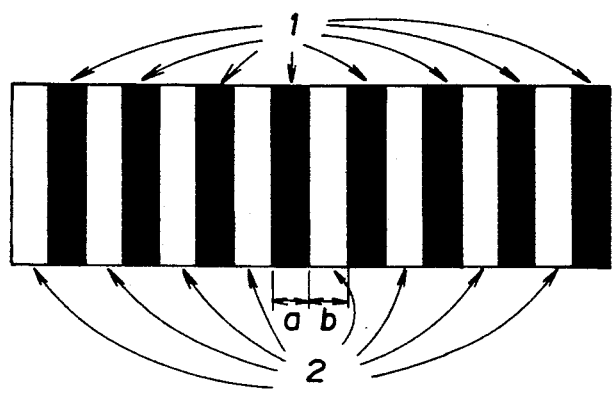
FIGS. 1 and 2 are schematic views for measuring a resolving power (bar/cm) of the display device of the present invention.

First, the coating liquids for forming conductive coatings of the present invention are illustrated below in the concrete.

The first coating liquid for forming conductive coating of the present invention comprises a homogeneous solution or dispersion of a zirconium oxysalt and a conductive substance in a mixed solvent comprising water, an inorganic solvent and a stabilizer. The components homogeneously dissolved or dispersed in the mixed solvent are illustrated hereinafter.

Useful as the zirconium oxysalt are zirconium oxychloride, zirconium oxynitrate, zirconium oxyacetate, zirconium oxyoxalate and the like. Of those exemplified above, particularly preferred are zirconium oxychloride and zirconium oxynitrate. Such zirconium oxysalts dissolve in water and organic solvents such as alcohols and the resulting solution is made acid when water is present therein.

The conductive substances used in the present invention are those which are known hitherto such as tin oxide, tin oxide doped with antimony, fluorine, phosphorus or the like, indium oxide or indium oxide doped with tin. These conductive substances are preferably in the form of fine particle having an average particle diameter of less than 0.4 μm.

In the application of the present first coating liquid to a face-plate of display devices such as CRT, LCD and the like or to a platen glass for copying machines or the like where a high transparency with a low haze is required, it is preferable to use in said coating liquid the conductive substances having an average particle diameter of 0.01–0.1 μm. Even though an average particle diameter of the conductive substance contained in the coating liquid is less than 0.1 μm, however, the substrate to which said coating liquid has been applied will decrease in transparency if the major proportion of particles of said conductive substance has a particle diameter exceeding 0.1 m and, therefore, it is preferable that at least 60% of the total of the particles is occupied by those having an average particle diameter of less than 0.1 μm.

In the present invention, it is particularly preferable to use as the conductive substances the products which are obtained on the basis of the process disclosed in a publication titled "Process for preparing conductive fine particles" (Japanese Patent Appln. No. 51008/1987) or a publication titled "Tin oxide sol and process for preparation thereof" (Japanese Patent Appln. No. 75283/1986), both filed by the present applicant. That is, preferably useful as the first conductive substances of the above-mentioned products are conductive metallic oxide fine particles which are obtained by the above-cited process, wherein an aqueous solution of a tin or indium compound is maintained under the condition of pH 8-12, the compound in the solution is gradually hydrolyzed to form a sol containing colloidal particles, and the resulting sol is dried and calcined followed by pulverization.

The starting materials used in the above process are tin or indium compounds which are water soluble and capable of hydrolysis in the pH range of 8-12, and usable are in the concrete such tin compounds as potassium stannate, sodium stannate and the like, or such indium compounds as indium nitrate, indium sulfate and the like.

When a metallic element present in an aqueous solution of a tin or indium compound (hereinafter sometimes called the starting solution) is either one of tin or indium, the resulting fine particles are composed of tin oxide or indium oxide. In that case, however, conductive fine particles doped with a foreign element can be obtained by dissolving small amounts of a compound containing said foreign element in the starting solution. For instance, conductive fine particles composed of tin oxide doped with antimony or fluorine can be obtained by dissolving small amounts of tartar emetic (antimonyl potassium tartarate) or ammonium fluoride in the starting solution containing a tin compound, and conductive fine particles composed of indium oxide doped with tin can be obtained by dissolving small amounts of a tin compound in the starting solution containing an indium compound.

Conductive particles doped with foreign elements may also be prepared by the following processes. That is, conductive fine particles composed of a tin compound doped with antimony, phosphorus, fluorine and the like can be prepared by a process which comprises using an aqueous solution of a tin compound as the starting solution, gradually hydrolyzing the tin compound in the solution under the aforementioned pH condition to form a sol, recovering colloidal particles from the resulting sol, impregnating the recovered colloidal particles with an aqueous solution of at least one of an antimony compound, phosphorus compound and fluorine compound, and thereafter drying the thus impregnated colloidal particles, followed by calcining. Furthermore, conductive fine particles composed of an indium compound doped with tin and/or fluorine can be prepared by a process which comprises using an aqueous solution of an indium compound as the starting solution, forming a sol in the same manner as above, recovering colloidal particles from the thus formed sol, impregnating the recovered colloidal particles with an aqueous solution of a tin compound and/or a fluorine compound, and then drying the thus pregnated particles, followed by calcining. In cases where the starting solution, even of an aqueous solution of a tin compound or an indium compound, is used, when by-product salts are formed during the source of forming a sol, not only colloidal particles formed in the sol tend to agglomerate but also a specific resistivity of the conductive fine particles obtained becomes higher by virtue of admixture with the by-product salts formed. It is therefore recommended that where formation of by-product salts is expected, the by-products salts as formed are washed to remove from colloidal particles recovered from the sol formed by hydrolysis, prior to impregnation of the colloidal particles with an aqueous solution of the foreign element compound.

Generally speaking, a concentration of the tin or indium compound contained in the starting solution is preferably in the range of 5-30% by weight, though the concentration may be selected optionally.

Usually, the reaction temperature of the hydrolysis may be selected at choice in the range of temperature between 30° and 90° C.

After preparation of the sol, colloidal particles formed therein are recovered by filtration therefrom, and the colloidal particles recovered are rinsed to remove by-product salts and the like attached to said particles, dried, calcined and then pulverized to obtain conductive fine particles. The fine particles thus obtained are sintered to a certain extent during the calcining step and an average particle diameter of the particles becomes about 20-50 μm but the particles are easily released from their sintered state when subjected to the subsequent pulverizing step, and the fine particles are then processed by an ordinary pulverization means to give conductive fine particles answering the objects of the present invention, which have an average particle diameter of less than about 0.4 μm when they are incorporated into coating materials. The fine particles obtained in the manner now described are found to contain only small amounts of coarse particles, for example, those having a particle diameter of larger than 0.8 μm.

Pulverization of the conductive substances may be carried out before or after mixing thereof with other components such as zirconium oxysalts and the like. The conductive substances can be pulverized by conventionally known methods, for example, those utilizing an attritor, sand mill, ball mill, triple roll or the like devices.

The conductive substances thus obtained may be used, when they are particles, as they are, or they can also be used after dispersing them in water or organic solvents.

The second conductive substance preferably used in the present invention is a conductive tin oxide sol obtained by heat treatment of fine particles of tin oxide or tin oxide doped with foreign elements in aqueous acid or alkali solutions.

The fine particles of tin oxide or tin oxide doped with foreign elements used herein may be those obtained by the first process mentioned previously, or those obtained by conventionally known methods.

This conductive tin oxide sol may be obtained by heat treatment of the above mentioned fine particles of tin oxides in aqueous solutions of acids such as mineral acids or organic acids or aqueous solutions of alkalis such as alkali metal hydroxides or quaternary ammonium salts. The heating temperature employed in this case is preferably less than about 200° C. Suitable amounts of the acids or alkalis used in the aqueous solutions is at least 5% by weight based on the fine particles to be treated. An average particle diameter of particles dispersed in the conductive tin oxide sol thus obtained is less than 0.1 μm, and more than 60% of the total particles is occupied by particles having an average particle diameter of less than 0.1 μm.

The above-mentioned conductive tin oxide sol is usually an aqueous sol, but it may also be used as an organic sol, if necessary, in which a part or whole of water has been replaced by an organic solvent such as alcohol or the like.

Organic solvents used in the coating liquids for forming conductive coatings of the present invention are alcohol such as methanol, ethanol, n-propanol, i-propanol, n-butanol, i-butanol, t-butanol, etc., esters such as methyl acetate, ethyl acetate, etc., ethers such as diethyl ether, etc., ketones such as methyl ethyl ketone, etc., ethylene glycol monomethyl ether and the like, which are used either singly or in combination.

The stabilizers used in the present coating liquids, either singly or in combination, are ethylene glycol, N-methyl-2-pyrrolidone, morpholine, ethyl cellosolve, methyl cellosolve, N,N-dimethylformamide, etc.

In the first coating liquid for forming conductive coating of the present invention which contains the above-mentioned components, the molar ratio of the stabilizer to the zirconium oxysalt in terms of $ZrO_2$ (stabilizer/$ZrO_2$) is 1–25, preferably 2–25. If a value of this ratio is less than 1, gellation of the coating liquid for forming conductive coating these components tends to occur undesirably and, on one hand, when this value exceeds 25, the coating liquid inhomogeneously cures when it is coated on a substrate to cure, whereby the conductive coating formed undesirably poor in permanence properties.

Further, the weight of water present in the coating liquid is preferably less than 40% of the whole weight of said coating liquid with the condition that the weight ratio of the water to the zirconium oxysalt in terms of $ZrO_2$ (water/$ZrO_2$) satisfactorily falls within the range of 0.1–40. If the above-mentioned ratio of water/$ZrO_2$ is less than 0.1, gellation of the zirconium oxysalt occur undesirably and, on one hand, when said ratio exceeds 40, the addition effect of the stabilizer disappears, with the result that adhesion of the coating liquid for forming conductive coating to a substrate becomes poor undesirably. Furthermore, the weight of the water exceeds 40% of the whole weight of the coating liquid, the addition effect of the stabilizer disappears likewise, with the result that adhesion of the coating liquid for forming conductive coating to a substrate becomes poor undesirably.

The sum total of the conductive substance and zirconium oxysalt in terms of $ZrO_2$ is preferably 0.1–10% by weight based on the whole weight of the coating liquid for forming conductive coating. It is not economical to use these two components in an amount of less than 0.1% by weight and, on one hand, if said amount exceeds 10% by weight, gellation of the coating liquid for forming conductive coating tends to occur undesirably and no possibility of the long-term preservation of said coating liquid can be expected.

Still further, the weight ratio of the conductive substance to zirconium oxysalt in terms of $ZrO_2$ (conductive substance/$ZrO_2$) is preferably 1–5. If this value is less than 1, the resulting conductive coating becomes poor in electrical conductivity and, on one hand, when the value exceeds 5, adhesion between a substrate and the conductive coating formed thereon undesirably decreases.

The coating liquids for forming conductive coatings as illustrated above may be prepared by mixing an aqueous solution of a zirconium oxysalt with a conductive substance and a stabilizer and, if necessary, removing part of the water present in the mixture therefrom by distillation or ultrafiltration, and thereafter adding an organic solvent to the mixture, followed by homogeneous mixing.

The second coating liquid for forming conductive coating of the present invention is illustrated hereinafter.

This coating liquid for forming conductive coating comprises a homogeneous solution or dispersion of a zirconium oxysalt non-sedimentary silica and conductive substance in a mixed solvent comprising water, organic solvent and stabilizer. The zirconium oxysalt, conductive substance, water, organic solvent and stabilizer used in the coating liquid are the same as those used in the first coating liquid for forming conductive coating of the present invention as illustrated above, and hence herein illustrated is the non-sedimentary silica.

The non-sedimentary silica used in the present invention is intended to designate that when an aqueous dispersion containing 2.0% by weight of the non-sedimentary silica in terms of $SiO_2$ is subjected for 1 hour at 250,000 G to centrifugal sedimentation, the sediment left thereby is less than 30% by weight of the total amount of $SiO_2$.

An aqueous dispersion of a non-sedimentary silica is obtained by removing a great part of alkali from an aqueous solution of alkali silicate, for example, by replacement of the alkali with hydrogen in the aqueous solution of alkali silicate by means of ion exchange, dialysis or the like. The stabilizer is used in the non-sedimentary silica dispersion in an amount of at least 0.5 mole based on 1 mole of the non-sedimentary silica.

Such stabilizer mentioned above plays a role in the stabilization of non-sedimentary silica in the dispersion by inhibiting gellation of said silica.

In this non-sedimentary silica, it is desirable that the amount of residual alkali represented by the $SiO_2/M_2O$ ratio (in which M represents an alkali metal) is at least 200, preferably at least 1000.

Such non-sedimentary silica as referred to above is illustrated in detail in Japanese Patent Appln. No. 187835/1986 filed previously by the present applicant.

In the second coating liquid for forming conductive coating of the present invention which contains the components as mentioned above, the molar ratio (stabilizer/$ZrO_2+SiO_2$) of the number of moles of the stabilizer to the number of the sum total of moles of the zirconium oxysalt in terms of $ZrO_2$ and of $SiO_2$ present in the non-sedimentary silica is 1–25, preferably 2–25. If this value is less than 1, gellation of the coating liquid tends to occur and a pot life (useful life) of said coating liquid becomes short and, on one hand, when said value exceeds 25, the coating liquid does not cure homogeneously when it is coated on a substrate, with the result that the conductive coating formed becomes poor in permanence properties.

In this second coating liquid, the amount of water present is preferably less than 50% by weight based on the weight of the coating liquid with the condition that the weight ratio (water/$ZrO_2$) of the water to zirconium oxysalt in terms of $ZrO_2$ is 0.1–40. If the water/-

$ZrO_2$ weight ratio mentioned above is less than 0.1, the zirconium oxysalt undesirably tends to gel and, on one hand, if said weight ratio exceeds 40, the addition effect of the stabilizer disappears and the coating liquid undesirably becomes poor in adhesion to a substrate. Furthermore, if the amount of water used exceeds 50% by weight of the coating liquid, the addition effect of the disappears likewise and the coating liquid undesirably becomes poor in adhesion to a substrate.

The sum total of the conductive substance, $SiO_2$ present in the non-sedimentary silica and the zirconium oxysalt in terms of $ZrO_2$ is 0.1–20%, preferably 0.1–10% by weight of the coating liquid. If a value of the said sum total is less than 0.1% by weight, the use of such coating liquid is not economical and, on one hand, if said value exceeds 20% by weight, undesirably the coating liquid tends to gel and cannot be preserved for a long period of time.

The weight ratio (conductive substance/$ZrO_2$+$SiO_2$) of the conductive substance to the sum total of the zirconium oxysalt in terms of $ZrO_2$ and $SiO_2$ contained in the non-sedimentary silica is preferably 1–5. If a value of this weight ratio is less than 1, the resulting coating becomes poor in electrical conductivity or does not become porous and, if this value exceeds 5, the resulting coating becomes poor in adhesion to a substrate. The weight ratio ($SiO_2/ZrO_2$) of $SiO_2$ contained in the non-sedimentary silica to the zirconium oxysalt in terms of $ZrO_2$ is preferably 0.05–1. If a value of this weight ratio is less than 0.05, adhesion of the conductive coating to the substrate undesirably tends to become poor. Whereas, if this value exceeds 1, the conductive coating tends to become less durable.

The coating liquid for forming conductive coating as illustrated above may be prepared by mixing together an aqueous solution of the zirconium oxysalt, the conductive substance and a dispersion of the non-sedimentary silica and, if necessary, removing a part of water therefrom by distillation or ultrafiltration, followed by homogeneously mixing the resulting mixture with an organic solvent.

The third coating liquid for forming conductive coating of the present invention is illustrated hereinafter.

This coating liquid for forming conductive coating comprises a homogeneous solution or dispersion of a zirconium oxysalt, silicon alkoxide or its derivative and a conductive substance in a mixed solvent comprising water and an organic solvent. The zirconium oxysalt conductive substance, water and organic solvent used in the coating liquid are the same as those used in the first coating liquid for forming conductive coating of the present invention, and hence herein illustrated is the silicon alkoxide or its derivative used in this coating liquid.

The silicon alkoxide or its derivative used in the present invention includes compounds or condensates (up to pentamers) having 1–4 alkoxy groups of 1 to 8 carbon atoms, said compounds being represented by $SiH_a(OR)_b$ ($a=0-3$, $b=1-4$, $a+b=4$, and R is alkyl), $(R'O)_aSi(OR)_b$ or $R'_aSi(OR)_b$ ($a=1-3$, $b=1-3$, $a+b=4$, and R and R' are each alkyl), or derivatives of the compounds or condensates represented by the above-mentioned formulas in which a part of H has been substituted with Cl, vinyl or the like group. Of those mentioned above, preferred are mixture of one or two or more compounds represented by the formula $Si(OR)_4$ (wherein R is $CH_3$, $C_2H_5$, n- and iso-$C_3H_7$, or n-, iso-, sec- and tert-$C_4H_8$).

In the third coating liquid for forming conductive coating of the present invention, which contains the components as mentioned above, the zirconium oxysalt and silicon alkoxide or its derivative are used in such an amount so that $ZrO_2/SiO_2$ (molar ratio) of the zirconium oxysalt in terms of oxide to silicon alkoxide or its derivative in terms of oxide is in the range of 0.05–2.0, preferably 0.2–1.0. If a value of this $ZrO_2/SiO_2$ (molar ratio) is less than 0.05, the resulting coating undesirably becomes poor in permanence properties and, on one hand, if this value exceeds 2.0, the resulting coating undesirably decreases in adhesion to a substrate and optical characteristics (haze, total light transmittance).

The presence of water in the coating liquid is necessary for hydrolysis reaction of silicon alkoxide. It is preferable to decide the amount of water in the coating liquid according to the amount of the silicon alkoxide or its derivative in the mixture, and desirably the water is contained in the coating liquid in such an amount so that the $H_2O/SiO_2$ molar ratio in the mixture of the water to silicon alkoxide or its derivative in terms of $SiO_2$ is at least 2. If a value of this ratio is less than 2, no coating is obtained since undecomposed silicon alkoxide or its derivative remains, as it is, even after formation of the coating.

The content of the conductive substance, when expressed as $MO_x$ in terms of oxide, is preferably in such an amount so that $MO_x/(SiO_2+ZrO_2)$ (weight ratio) is 0.5–5.0. If a value of this weight ratio is less than 0.5, undesirably the resulting conductive coating becomes excessively low in electrical conductivity and, on one hand, if this value exceeds 5.0, undesirably the resulting conductive coating becomes poor in adhesion to a substrate.

When the solids content (conductive substance+$ZrO_2+SiO_2$) in the conductive coating liquid is less than about 20% by weight, a coating answering the objects of the present invention is obtained. However, if this solids concentration exceeds 20% by weight, the coating liquid becomes poor in stability and cannot be fit for a long-term preservation. If this solids concentration is excessively low, such an inconvenience that the coating operation of the conductive coating liquid must be repeated several times to obtain a desired coating is experienced and hence a practically useful solids concentration is at least about 0.1% by weight.

Since water and an organic solvent such as alcohol or the like are present in this conductive coating liquid as mentioned above, the zirconium oxysalt dissolves in the water and organic solvent, whereby the coating liquid comes to exhibit acidic properties with a pH of less than 2. On that account, there is no need of incorporating into the coating liquid an acid catalyst such as hydrochloric acid, nitric acid or the like with the purpose of hydrolyzing the silicon alkoxide or its derivative.

The fourth coating liquid for forming conductive coating of the present invention is illustrated hereinafter.

This coating liquid for forming conductive coating contains a non-sedimentary silica and a stabilizer in addition to such components as used in the above-mentioned third coating liquid for forming conductive coating. The non-sedimentary silica and stabilizer used in this coating liquid are the same as those used in the second coating liquid for forming conductive coating of the present invention.

When this non-sedimentary silica is used together with the silicon alkoxide or its derivative in the coating liquid for forming conductive coating, total light transmittance of the resulting conductive coating is increased and transparency of said coating is improved and, moreover, permanence properties of the coating is not marred.

The non-sedimentary silica is preferably used in such an amount so that the weight ratio ($SiO_2$ in non-sedimentary silica/$SiO_2$ in silicon alkoxide or its derivative) of $SiO_2$ in the non-sedimentary silica to the silicon alkoxide or its derivative in terms of $SiO_2$ is less than 9. If a value of this weight ratio exceeds 9, such a new problem that the heating temperature of the resulting coating must be increased to about 300° C. or higher in order to improve permanence properties of the coating arises undesirably, though transparency of the coating is further improved.

Even in the case where the non-sedimentary silica is used, the operation conditions and compositions to be employed therein, such as the ratio of $ZrO_2$ to total $SiO_2$ in the coating liquid and the like, are the same as those employed in the aforementioned case where only the silicon alkoxide or its derivative is used.

Illustrated below are the processes by which the above-mentioned third and fourth coating liquids for forming conductive coatings of the present invention are prepared.

The zirconium oxysalt, silicon alkoxide or its derivative and conductive substance, if necessary, the non-sedimentary silica and stabilizer, are homogeneously mixed together in a mixture of water and an organic solvent. In that case, the order of dissolving or dispersing these components is not particularly limited, for instance, an aqueous solution of the zirconium oxysalt may be mixed with an organic solvent such as alcohol or the like, and the resulting mixture may be incorporated with an alcohol solution of the silicon alkoxide or its derivative, or these solutions mentioned above may be mixed together at a stroke. It is also possible to increase stability of the dispersed particles of the components by incorporating the coating liquid with a surfactant at the time when the above-mentioned solutions are mixed together.

The fifth coating liquid for forming conductive coating of the present invention is illustrated hereinafter.

The fifth coating liquid for forming conductive coating of the present invention a homogeneous solution or dispersion of diacetylacetonato-dialkoxy zirconium, a partial hydrolysate of silicon alkoxide and a conductive substance in a mixed solvent comprising water and an organic solvent. The conductive substance, water and organic solvent used in this coating liquid, however, are the same as those used in the aforementioned first coating liquid for forming conductive coating of the present invention, and hence herein illustrated are the diacetylacetonato-dialkoxy zirconium and partial hydrolysate of silicon alkoxide.

The diacetylacetonato-dialkoxy zirconium may be sufficiently useful if its alkoxy group, preferably butoxy group, has 1 to 8 carbon atoms. This diacetylacetonato-dialkoxy zirconium plays a role in improving dispersibility and heat stability of the conductive substance, and this role is considered ascribable to the fact that the diacetylacetonato-dialkoxy zirconium acts as a protective colloid on the conductive substance.

The partial hydrolysate of silicon alkoxide or its derivative used in this coating liquid may be obtained by partial hydrolysis of the silicon alkoxide or its derivative used in the third coating liquid for forming conductive coating of the present invention.

As the conditions under which the partial hydrolysis is carried out, there may be adopted a procedure generally employed for partial hydrolysis of silicon alkoxide or its derivative. For instance, such conditions may be adopted, wherein silicon alkoxide or its derivative is mixed with methanol or ethanol, and the mixture is incorporated with water and an acid to effect the partial hydrolysis of the silicon alkoxide or its derivative. However, the partial hydrolysis conditions particularly preferred are such that the acid used is preferably hydrochloric acid, nitric acid, phosphoric acid or acetic acid, and the mixing ratio of the acid to silicon alkoxide or its derivative (acid/$SiO_2$) is preferably 0.01–0.5 (the weight ratio of the acid to silicon alkoxide or its derivative in terms of $SiO_2$). If a value of this ratio is less than 0.01, large amounts of unreacted silicon alkoxide remain to exist in the mixture, which undesirably mars electrical conductivity of the resulting coating and, on one hand, if this value exceeds 0.5, the rate of the partial hydrolysis becomes excessively rapid and undesirably the resulting coating liquid decreases in continuous productivity and preservability. The mixing ratio of water to silicon alkoxide (molar ratio) is preferably at least 2. If a value of this ratio is less than 2, unreacted silicon alkoxide remains in the resulting coating which will undesirably decrease in adhesion to substrate, scratch resistance and alkali resistance. The partial hydrolysis temperature employed is preferably 30°–60° C.

The fifth coating liquid for forming conductive coating of the present invention illustrated above may be prepared by adding the diacetylacetonato-dialkoxy zirconium to a mixture of water and the organic solvent in which the conductive substance has been dispersed, thereby improving dispersibility and heat stability of the conductive substance, and then incorporating the resulting mixture with the partial hydrolysate of silicon alkoxide or its derivative. The incorporation of the partial hydrolysate of silicon alkoxide or its derivative into the above-mentioned mixture, prior to the addition of the diacetylacetonato-dialkoxy zirconium to said mixture, is not desirable since the conductive substance dispersed in the mixture comes to agglomerate.

The coating liquid for forming transparent conductive coating thus prepared has such advantages as will be mentioned below. First, the conductive coating formed therefrom is excellent in transparency and electrical conductivity since the conductive substance dispersed in the coating liquid is left in a monodisperse state by the protective colloidal action of the diacetylacetonato-dialkoxy zirconium added to said coating liquid. Second, the coating liquid is improved in stability and hence no gellation thereof occur and the stabilized coating liquid can be preserved for a long period of time even at room temperature of about 30° C. Furthermore, the diacetylacetonato-dialkoxy zirconium together with the partial hydrolysate of silicon alkoxide or its derivative forms a matrix of the resulting conductive coating, whereby said coating is increased in scratch resistance and alkali resistance, and because of the presence of said diacetylacetonato-dialkoxy zirconium and said partial hydrolysate of silicon alkoxide or its derivative in the coating liquid, a desired conductive coating can be formed when said coating liquid as applied is heated at the temperature of about 150° C., and the conductive coating further improved in electrical conductivity is obtained when the coating liquid is heated at above 200° C.

In the fifth coating liquid for forming conductive coating of the present invention which contains the components as illustrated above, the diacetylacetonato-dialkoxy zirconium and the conductive substance are preferably used in such an amount so that the $ZrO_2/MO_x$ weight ratio of these two components in terms of oxide is 0.01–1 ($MO_x$ represents the conductive substance as an oxide). If a value of this ratio is less than 0.01, undesirably the conductive substance decreases in dispersibility and heat stability, the resulting conductive coating becomes poor in transparency and adhesion to a substrate, and the coating liquid becomes poor in preservability and continuous productivity. If this value exceeds 1, on one hand, undesirably the resulting conductive coating becomes poor in transparency and adhesion to a substrate and decreases in electrical conductivity.

The diacetylacetonato-dialkoxy zirconium and silicon alkoxide are preferably used in such an amount so that the $ZrO_2/SiO_2$ weight ratio of these two components in terms of oxide is 0.05–1. If a value of this ratio is less than 0.05, the resulting conductive coating is not sufficient in alkali resistance and, on one hand, if this value exceeds 1, undesirably the resulting conductive coating decreases in adhesion to substrate and transparency.

The conductive substance and other two components are preferably used in such an amount so that the $MO_x/(SiO_2+ZrO_2)$ weight ratio of the components in terms of oxide is 0.5–5. If a value of this ratio is less than 0.5, undesirably the resulting conductive coating is not sufficient in electrical conductivity and, on one hand, if this value exceeds 5, the resulting conductive coating decreases in adhesion to a substrate, transparency and scratch resistance.

Furthermore, if the solids concentration ($MO_2+SiO_2+ZrO_2$) in the coating liquid is less than 15% by weight, the conductive coating answering the objects of the present invention may be obtained. If the above-mentioned solids concentration exceeds 15% by weight, undesirably the coating liquid becomes poor in preservability. If this solids concentration is excessively low, it becomes necessary to repeat the coating operation several times in order to the desired conductive coating, and hence a practically useful solids concentration is at least 0.1% by weight.

The thus obtained first to fifth coating liquids for forming conductive coatings of the present invention are coated on substrates such as glass or plastics according to the conventionally known methods such as spinner, spray, bar coater, role coater and the like methods. Subsequently, a film of the coating formed on the substrate is dried to cure at a temperature of from ordinary temperature to about 120° C., whereby the desired conductive coating excellent in adhesion to the substrate, scratch resistance and transparency is obtained. When the conductive coating thus obtained is further heated, the resulting coating is further improved in permanence properties such as alkali resistance and the like.

The substrate on which a transparent conductive coating has been formed, said conductive coating comprising zirconium oxide, conductive substance and silicon oxide, has a glossiness of less than 190% as measured at an angle of measurement of 60° according to the method of measurement of glossiness stipulated in JIS K 7105-81, such excellent electrical conductivity as evidenced by its surface resistivity of $10^3$–$10^{11}$ Ω/□, such excellent transparency as evidenced by its total light transmittance of at least 80% and haze of less than 10% and, moreover, has excellent permanence properties such as adhesion to the substrate, scratch resistance, alkali resistance and the like.

The display device of the present invention and process for manufacturing the same are illustrated hereinafter.

The present display device comprises a face-plate as a substrate, on the surface of which a transparent conductive coating has been formed, said transparent conductive coating comprising zirconium oxide, silicon oxide and a conductive substance, and said face-plate having a glossiness of 30–100% as measured at an angle of measurement of 60° according to the method of measurement of glossiness stipulated in JIS K 7105-81, a resolving power of at least 50 bars/cm, and a surface resistivity of $10^3$–$10^{11}$ Ω/□.

The glossiness of the face-plate is represented by a value of glossiness as measured at an angle of measurement of 60° according to the method of measurement of glossiness stipulated in JIS K 7105-81, as mentioned above. If this value is less than 30%, undesirably the face-plate decreases in transparency and, on one hand, if the value exceeds 90%, regular reflection of the coating is not decreased and the face-plate glares, therefore the glossiness is preferably less than 90%, though the upper limit of this value is not particularly defined.

The face-plate has a resolving power of at least 50 bars/cm, as mentioned above. If this value is less than 50 bars/cm, undesirably the face-plate becomes poor in transparency.

Figure 2:
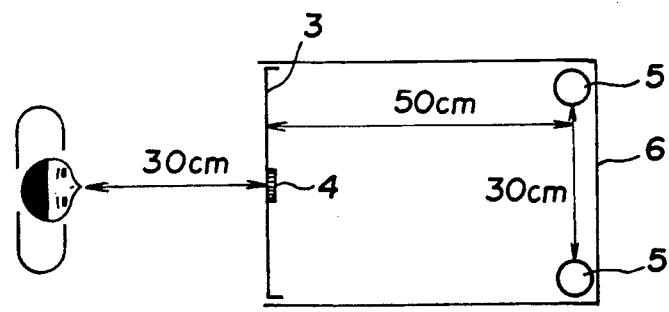

In the present specification, the resolving power of the face-plate was expressed by way of the number of bars per cm in a bar chart, said number of bars being capable of being counted distinctly by visual observation of the chart. That is, the resolving power is determined by using a box of 50 by 30 centimeters wherein a face-plate having attached a bar chart as shown in FIG. 1 to the side on which no coating is coated is arranged at one wall of the box in the manner as shown in FIG. 2 so that the coated side of the panel faces outward, and the face-plate thus arranged is visually observed at a distance of 30 cm from the coated side to count the number of bars per cm in the bar chart that can be distinctly confirmed. In that case, the box is provided with 20 W fluorescent lamps at both ends of the other wall of the box provided with no face-plate, and the surface of the wall of the box provided with no face-plate is colored white. The bar chart used included those in which the number of bars is increased every 5 bars/cm, for example, 10 bars/cm, 15 bars/cm, 20 bars/cm, 25 bars/cm and the like.

In the bar charts thus used, 1 is a bar printed, 2 is a space between the printed bars, and a width a of the printed bar is equal to a width b of the space.

In the display device of the present invention, an average surface roughness Rz (a ten-point average roughness as measured in accordance with JIS B 0601-82) of the face-plate is 0.2–5 μm, preferably 0.2–3 μm. If this average surface roughness is less than 0.2 μm, undesirably the face-plate decreases in non-glare and no sufficient antistatic effect is obtained, though the plate is excellent in resolving power and transparency and, on one hand, if the average surface roughness exceeds 5 μm, undesirably the face-plate decreases in resolving power and transparency.

The present display device may be prepared by using the second to fifth coating liquids for forming conductive coatings of the present invention mentioned previously.

That is, the face-plate of the present display device may be prepared by coating a face-plate previously heated to and kept at 40°–90° C., preferably 50°–70° C., with any of the second to fifth coating liquids for forming conductive coatings of the present invention by the spray method, followed by drying and/or heating.

If a heating temperature of the face-plate is less than 40° C., undesirably the liquid components of the coating liquid as coated will not dry sufficiently and undergo leveling, whereby no non-glare coating is obtained and, on one hand, if this temperature exceeds 90° C., undesirably the liquid components will dry rapidly, whereby the resulting coating becomes poor in adhesion to the plate, transparency and permanence properties. When the coating liquid is coated on the face-plate by the spray method, therefore, the coating amount, coating speed and air pressure supplied to the spray should be controlled so that the heating temperature of the face-plate does not deviate from the above-mentioned temperature range.

Subsequently, the display device of the present invention is obtained by drying the face-plate thus coated by the spray method with the coating liquid for forming conductive coating. When a coating having higher permanence properties and mechanical strength is needed, such coating may be obtained by heating the face-plate as coated in the manner now described at a temperature of above 200° C. but below the glass transition point of the face-plate. In that case, the heating operation may be repeated many times so long as the heating temperature employed is below the glass transition point of the face-plate. In cases where non-glare is not needed according to the purpose for which the display device is used, a desired coating having lesser non-glare or substantially no non-glare may be obtained by varying the spray conditions to be employed.

Furthermore, the face-plate of the display device of the present invention may be prepared by coating the coating liquid for forming conductive coating on a face-plate by the spray method in the manner now described, drying and/or heating the thus coated face-plate, coating by the spray method a coating liquid comprising transparent protective components on the thus dried and/or heated face-plate at 40°–90° C., and then drying and/or heated the thus coated face-plate.

Usable as the coating liquid comprising transparent protective components are the second to fifth coating liquids for forming conductive coatings, from which the conductive substance has been excluded.

As the coating liquid comprising transparent protective components, moreover, there may also be used a liquid prepared by homogeneously dissolving or dispersing a binder resin in an organic solvent. Useful binder resins include silicon resins, melamine resins, urethane resins and the like.

The present invention is illustrated below with reference to examples, but it should be construed that the invention is in no way limited to those examples.

EXAMPLE 1

Preparation of Conductive Tin Oxide Sol

A starting solution was prepared by dissolving 316 g of potassium stannate and 38.4 g of tartar emetic in 686 g of water. The starting solution together with nitric acid was added over 12 hours to 1000 g of water warmed at 50° C. with stirring and subjected to hydrolysis while maintaining a pH of the system at 8.5, whereby a sol liquid was obtained. Colloidal particles were separated by filtration from the sol, washed to remove by-product salts therefrom, dried, calcined at 350° C. for 3 hours in air, and then further calcined at 650° C. for 2 hours in air to obtain fine powder (I). To 1600 g of an aqueous potassium hydroxide solution (containing 40 g of KOH) was added 400 g of the fine powder (I), and the mixture kept at 30° C. was stirred for 3 hours with a sand mill to obtain conductive tin oxide colloid.

Subsequently, this conductive tin oxide colloid was treated with an ion exchange resin to obtain dealkalized conductive tin oxide colloid (a conductive sol). This dealkalized conductive sol contained no precipitate, had a solids concentration of 20% by weight and colloidal particles having an average particle diameter of 0.07 $\mu$m. The amount of colloidal particles having a particle diameter of less than 0.1 $\mu$m was 87% of the total amount of colloidal particles.

In this connection, the measurement of average particle diameter of the colloidal particles was conducted with an ultracentrifugal particle sized distribution analyzer, (CAPA-500 manufactured and sold by Horiba Seisakusho K. K.), wherein a test specimen was adjusted to a solids concentration of 0.5% by weight and subjected to centrifugal sedimentation at 5000 rpm. (The same shall apply hereinafter)

A mixture comprising 250 g of the conductive sol obtained above, 225 g of N-methyl-2-pyrrolidone (hereinafter called NMP) and 100 g of an aqueous solution of 25% by weight of zirconium oxychloride in terms of $ZrO_2$ (hereinafter called ZOC) was heated at 80° C. with a rotary evaporator under reduced pressure, thereby distilling off 75 g of water. The liquid obtained was cooled and then thoroughly mixed with 1000 g of a mixture of MeOH/BuOH (1/1 weight ratio) to obtain a coating liquid for forming conductive coating.

EXAMPLE 2

A mixture comprising 100 g of the conductive sol obtained in Example 1, 45 g of NMP and 20 g of ZOC was heated at 80° C. with a rotary evaporator under reduced pressure to distill off 15 g of water. The liquid obtained was cooled and thoroughly mixed with 350 g of a mixture of MeOH/EtOH (1/1 weight ratio) to obtain a coating liquid for forming conductive coating.

EXAMPLE 3

Following substantially the same procedure as described in Example 1, a coating liquid for forming conductive coating was obtained, except that in place of the ZOC used in Example 1, there was used an aqueous solution of zirconium oxynitrate (hereinafter called ZON) containing 25% by weight of ZON in terms of $ZrO_2$.

EXAMPLE 4

A homogeneous mixture comprising 100 g of the conductive sol obtained in Example 1, 90 g of NMP and 40 g of ZOC was heated at 80° C. with a rotary evaporator under reduced pressure to distill off 15 g of water. The liquid obtained was cooled and thoroughly mixed with 2800 g of a mixture of MeOH/EtOH (1/1 weight ratio) to obtain a coating liquid for forming conductive coating.

EXAMPLE 5

A homogeneous mixture comprising 250 g of the conductive sol liquid obtained in Example 1, 150 g of NMP and 100 g of ZOC was heated at 80° C. with a rotary evaporator under reduced pressure and thoroughly mixed with 425 g of a mixture of MeOH/EtOH (1/1 weight ratio) to obtain a coating liquid for forming conductive coating.

EXAMPLE 6

Following substantially the same procedure as described in Example 1, a coating liquid for forming conductive coating was obtained, except that in place of the NMP used in Example 1, there was used 225 g of methyl cellosolve.

EXAMPLE 7

Following substantially the same procedure as described in Example 1, a coating liquid for forming conductive coating was obtained, except that in place of the NMP used in Example 1, there was used 225 g of ethylene glycol.

EXAMPLE 8

Following substantially the same procedure as described in Example 1, a coating liquid for forming conductive coating was obtained, except that in place of the NMP used in Example 1, there was used 225 g of N,N-dimethylformamide.

EXAMPLE 9

A mixture comprising 83.3 g of a liquid prepared by diluting the conductive sol liquid obtained in Example 1 with water to 12% by weight, 60 g of NMP, 100 g of 5% by weight of ZOC in terms of $ZrO_2$, and 256.7 g of a mixture of MeOH/EtOH (1/1 weight ratio) was thoroughly blended to obtain a coating liquid for forming coating.

EXAMPLE 10

A mixture of 50 g of the fine powder (I) obtained in Example 1 and 200 g of water was fed to a sand mill, and the mixture was subjected for 3 hours to pulverization with media of 1-2 mm $\phi$ media. After the pulverization, an average particle diameter of particles in the liquid was 0.25 μm.

Following substantially the same procedure as described in Example 1, a coating liquid for forming conductive coating was obtained except that there was used the conductive sol dispersion obtained in the manner now described was used.

EXAMPLE 11

To a sand mill was fed a mixture comprising 50 g of the fine powder (I) obtained in Example 1, which had been classified into the powder having a particle diameter of less than 1 μm, and 200 g of water, and the mixture was subjected to pulverization for 3 hours with 0.3–1 mm $\phi$ media to obtain a conductive tin oxide dispersion. Following substantially the same procedure as described in Example 1, a coating liquid for forming conductive coating was obtained except that there was used the conductive tin oxide dispersion obtained above was used.

In this connection, an average particle diameter of particles in the dispersion after the pulverization was 0.08 μm, and the amount of particles having a particle diameter of less than 0.1 μm was 65% of the amount of total particles.

EXAMPLE 12

There were prepared a solution of 79.9 g of indium nitrate in 686 g of water and a solution of 12.7 g of potassium stannate in an aqueous solution of 10% by weight of potassium stannate. Both indium nitrate and potassium stannate solutions obtained above were added to 1000 g of water warmed at 50° C. with stirring and subjected to hydrolysis while maintaining a pH of the system at 11, whereby a sol was obtained.

Colloidal particles present in the sol were separated therefrom by filtration, washed to remove by-product salts therefrom, dried, calcined at 350° C. for 3 hours in air, and then further calcined at 600° C. for 2 hours in air to obtain a fine powder (II).

Following substantially the same procedure as described in Example 10, a coating liquid for forming conductive coating was obtained except that 50 g of the fine powder (II) obtained above was used.

In this connection, an average particle diameter of particles in the dispersion after pulverization was 0.29 μm.

COMPARATIVE EXAMPLE 1

A homogeneous mixture comprising 25 g of the conductive sol obtained in Example 1, 90 g of NMP and 40 g of ZOC was heated at 80° C. under reduced pressure with a rotary evaporator to distill off 25 g of water. The liquid obtained was cooled and thoroughly mixed with 170 g of a mixture of MeOH/EtOH (1/1 weight ratio) to obtain a coating liquid for forming conductive coating.

COMPARATIVE EXAMPLE 2

A homogeneous mixture comprising 175 g of the conductive sol obtained in Example 1, 45 g of NMP and 20 g of ZOC was heated at 80° C. under reduced pressure with a rotary evaporator to distill off 14 g of water. The liquid obtained was cooled and thoroughly mixed with 574 g of a mixture of MeOH/EtOH (1/1 weight ratio) to obtain a coating liquid for forming conductive coating.

COMPARATIVE EXAMPLE 3

A homogeneous mixture comprising 250 g of the conductive sol obtained in Example 1, 4 g of NMP and 100 g of ZOC was heated at 80° C. under reduced pressure, and 200 g of water was distilled off therefrom, whereupon gellation occurred.

COMPARATIVE EXAMPLE 4

A mixture comprising 100 g of the conductive sol obtained in Example 1, which had been diluted with water to 10% by weight, 60 g of NMP, 100 g of 3% by weight of ZOC in terms of $ZrO_2$, and 256.7 g of a mixture of MeOH/EtOH (1/1 weight ratio) was thoroughly mix to obtain a coating liquid for forming conductive coating.

In Table 1, the composition of liquid and ratio of components used in each of the foregoing examples and comparative examples were shown.

Using a spinner operated at a rate of 2000 rpm, coated individually on a glass plate were the coating liquids for forming conductive coatings obtained respectively in Examples 1-7, 9, 11 and 12, and Comparative Examples 1, 2 and 4, and on an acrylic resin plate was the coating liquid for forming conductive coating obtained in Example 8.

Respective coatings were obtained on the glass plates thus coated by drying them at 110° C. for 10 minutes, followed by heating at 300° C. for 30 minutes, and on the acrylic resin plate thus coated by drying at 110° C. for 30 minutes. Evaluation of the coatings thus obtained was conducted with respect to the test items mentioned below. The results obtained are shown in Tables 2 and 3.

(1) Transparency: Total light transmittance (Tt) and haze (H) were measured with a haze computer (manufactured and sold by Suga Shikenki K. K.).

(6) Permanence properties: The coated plate was immersed in the following four kinds of liquids to evaluate adhesion of the coating to the plate, and the glossiness and surface resistivity of the coating as determined before the test with those as measured after the test.

1) Immersion of the plate in 15% by weight aqueous ammonia solution at room temperature for 120 hours.
2) Immersion of the plate in 10% by weight aqueous NaCl solution at room temperature for 120 hours.
3) Immersion of the plate in boiling water for 30 minutes.
4) Immersion of the plate is 50% by weight aqueous acetic acid solution at room temperature for 120 hours.

TABLE 1

| | Composition of liquid | | | | | Ratio of components | | | | | | |
|---|---|---|---|---|---|---|---|---|---|---|---|---|
| | $ZrO_2$ (g) | Particle (Note 1) (g) | $H_2O$ (g) | Stabilizer (g) | Organic solvent (g) | Total (g) | Solids content (Note 2) (wt %) | Particle $ZrO_2$ (g/g) | $H_2O$ $ZrO_2$ (wt %) | Stabilizer $ZrO_2$ (g/g) | Stabilizer (wt %) | $ZrO_2$ (mol/mol) | Pot life (R.T) |
| Example | | | | | | | | | | | | | |
| 1 | 25.0 | 50.0 | 200.0 | 225.0 | 1000.0 | 1500.0 | 5.0 | 2.0 | 13.3 | 8.0 | 15.0 | 11.2 | >3 months |
| 2 | 5.0 | 20.0 | 80.0 | 45.0 | 350.0 | 500.0 | 5.0 | 4.0 | 16.0 | 16.0 | 9.0 | 11.2 | >3 months |
| 3 | 25.0 | 50.0 | 200.0 | 225.0 | 1000.0 | 1500.0 | 5.0 | 2.0 | 13.3 | 8.0 | 15.0 | 11.2 | >3 months |
| 4 | 10.0 | 20.0 | 80.0 | 90.0 | 2800.0 | 3000.0 | 1.0 | 2.0 | 2.7 | 8.0 | 3.0 | 11.2 | >3 months |
| 5 | 25.0 | 50.0 | 100.0 | 150.0 | 425.0 | 750.0 | 10.0 | 2.0 | 13.3 | 4.0 | 20.0 | 7.5 | >3 months |
| 6 | 25.0 | 50.0 | 200.0 | 225.0 | 1000.0 | 1500.0 | 5.0 | 2.0 | 13.3 | 8.0 | 15.0 | 14.6 | >3 months |
| 7 | 25.0 | 50.0 | 200.0 | 225.0 | 1000.0 | 1500.0 | 5.0 | 2.0 | 13.3 | 8.0 | 15.0 | 17.9 | >3 months |
| 8 | 25.0 | 50.0 | 200.0 | 225.0 | 1000.0 | 1500.0 | 5.0 | 2.0 | 13.3 | 8.0 | 15.0 | 15.1 | >3 months |
| 9 | 5.0 | 10.0 | 168.3 | 60.0 | 256.7 | 500.0 | 3.0 | 2.0 | 33.7 | 33.7 | 12.0 | 14.9 | >3 months |
| 10 | 25.0 | 50.0 | 200.0 | 225.0 | 1000.0 | 1500.0 | 5.0 | 2.0 | 13.3 | 8.0 | 15.0 | 11.2 | >3 months |
| 11 | 25.0 | 50.0 | 200.0 | 225.0 | 1000.0 | 1500.0 | 5.0 | 2.0 | 13.3 | 8.0 | 15.0 | 11.2 | >3 months |
| 12 | 25.0 | 50.0 | 200.0 | 225.0 | 1000.0 | 1500.0 | 5.0 | 2.0 | 13.3 | 8.0 | 15.0 | 11.2 | >3 months |
| Compar. Example | | | | | | | | | | | | | |
| 1 | 10.0 | 5.0 | 25.0 | 90.0 | 170.0 | 300.0 | 5.0 | 0.5 | 8.3 | 2.5 | 30.0 | 11.2 | >3 months |
| 2 | 5.0 | 35.0 | 141.1 | 45.0 | 574.0 | 800.0 | 5.0 | 7.0 | 17.6 | 28.2 | 5.6 | 11.2 | >3 months |
| 3 | 25.0 | 50.0 | 75.0 | 4.0 | — | — | — | 2.0 | — | 3.0 | — | 0.2 | gelation |
| 4 | 3.0 | 10.0 | 187.0 | 15.0 | 218.0 | 433.0 | 3.0 | 3.3 | 43.2 | 62.3 | 3.5 | 6.2 | >3 months |

(Note 1) Particle: Conductive substance
(Note 2) Solids content: ($ZrO_2$ + conductive substance)/($ZrO_2$ + conductive substance + $H_2O$ + stabilizer + diluent)

(2) Glossiness: Glossiness (G) was measured at an angle of measurement of 60° C. in accordance with the method of measurement of glossiness stipulated in JIS K7105-81. This glossiness is represented by a relative value of the test specimen to the reflactance of the standard plate, and stands in such relationships that the higher is the reflactance, the higher is the glossiness, and the lower is the reflactance, the lower is the glossiness.

(3) Adhesion: A part of piece of commercially available cellophane tape of 12 mm in width was allowed to stick on the coating while holding the remaining part of the tape perpendicular to the coating, and then the tape is instantaneously peeled off therefrom to visually observe whether the coating remained undetached or not.

(4) Hardness: Hardness of the coating was measured by subjecting to the pencil hardness test stipulated in JIS D0202-71.

(5) Surface resistivity: Surface resistivity of the coating was measured with an electrode cell (manufactured and sold by YHP).

TABLE 2

| Item No. | Transparency Tt (%) | H (%) | Glossiness G (%) | Surface resistivity ($\Omega/\square$) | Adhesion | Hardness |
|---|---|---|---|---|---|---|
| Example | | | | | | |
| 1 | 91.5 | 2.0 | 136 | $3 \times 10^6$ | ○ | >9H |
| 2 | 91.0 | 2.0 | 131 | $8 \times 10^5$ | ○ | >9H |
| 3 | 92.0 | 2.0 | 140 | $1 \times 10^6$ | ○ | >9H |
| 4 | 92.5 | 1.5 | 131 | $8 \times 10^6$ | ○ | >9H |
| 5 | 90.0 | 3.0 | 126 | $5 \times 10^5$ | ○ | >9H |
| 6 | 91.0 | 2.0 | 134 | $5 \times 10^6$ | ○ | >9H |
| 7 | 91.3 | 2.0 | 130 | $2 \times 10^6$ | ○ | >9H |
| 8 | 91.0 | 2.0 | 133 | $1 \times 10^6$ | ○ | 8H |
| 9 | 92.2 | 2.5 | 125 | $5 \times 10^6$ | ○ | >9H |
| 10 | 89.0 | 6.5 | 89 | $2 \times 10^7$ | ○ | 9H |
| 11 | 91.8 | 1.8 | 138 | $2 \times 10^6$ | ○ | >9H |
| 12 | 84.0 | 8.8 | 78 | $2 \times 10^4$ | ○ | 9H |
| Compar. Ex. | | | | | | |
| 1 | 92.0 | 2.0 | 145 | $1 \times 10^{11}$ | ○ | >9H |
| 2 | 90.0 | 3.0 | 125 | $2 \times 10^8$ | X | 7H |

Adhesion: The specimen was rated ○ when its coating did not peel off, and rated X when the coating peeled off.

TABLE 3

| No. | Item | Aqueous ammonia | NaCl | Boiling water | Aqueous acetic water |
|---|---|---|---|---|---|
| Example 1 | Glossiness (%) | No change | ← | ← | ← |
| | Surface resistivity (Ω/□) | No change | ← | ← | ← |
| | Adhesion | ◯ | ← | ← | ← |
| Example 2 | Glossiness (%) | No change | ← | ← | ← |
| | Surface resistivity (Ω/□) | No change | ← | ← | ← |
| | Adhesion | ◯ | ← | ← | ← |
| Example 3 | Glossiness (%) | No change | ← | ← | ← |
| | Surface resistivity (Ω/□) | No change | ← | ← | ← |
| | Adhesion | ◯ | ← | ← | ← |
| Example 4 | Glossiness (%) | No change | ← | ← | ← |
| | Surface resistivity (Ω/□) | No change | ← | ← | ← |
| | Adhesion | ◯ | ← | ← | ← |
| Example 5 | Glossiness (%) | No change | ← | ← | ← |
| | Surface resistivity (Ω/□) | No change | ← | ← | ← |
| | Adhesion | ◯ | ← | ← | ← |
| Example 6 | Glossiness (%) | No change | ← | ← | ← |
| | Surface resistivity (Ω/□) | No change | ← | ← | ← |
| | Adhesion | ◯ | ← | ← | ← |
| Example 7 | Glossiness (%) | No change | ← | ← | ← |
| | Surface resistivity (Ω/□) | No change | ← | ← | ← |
| | Adhesion | ◯ | ← | ← | ← |
| Example 8 | Glossiness (%) | 146 | No change | ← | ← |
| | Surface resistivity (Ω/□) | No change | ← | ← | ← |
| | Adhesion | ◯ | ← | ← | ← |
| Example 9 | Glossiness (%) | No change | ← | ← | ← |
| | Surface resistivity (Ω/□) | No change | ← | ← | ← |
| | Adhesion | ◯ | ← | ← | ← |
| Example 10 | Glossiness (%) | No change | ← | ← | ← |
| | Surface resistivity (Ω/□) | No change | ← | ← | ← |
| | Adhesion | ◯ | ← | ← | ← |
| Example 11 | Glossiness (%) | No change | ← | ← | ← |
| | Surface resistivity (Ω/□) | No change | ← | ← | ← |
| | Adhesion | ◯ | ← | ← | ← |
| Example 12 | Glossiness (%) | No change | ← | ← | ← |
| | Surface resistivity (Ω/□) | No change | ← | ← | ← |
| | Adhesion | ◯ | ← | ← | ← |
| Compar. Ex. 1 | Glossiness (%) | No change | ← | ← | ← |
| | Surface resistivity (Ω/□) | $5 \times 10^1$ | $4 \times 10^{10}$ | $2 \times 10^{11}$ | $2 \times 10^{10}$ |
| | Adhesion | $\mathrm{O}^0$ | ← | ← | ← |
| Ex. 2 | Glossiness (%) | Peeled | No change | Peeled | No change |
| | Surface resistivity (Ω/□) | $10^{13}$ or more | $5 \times 10^8$ | $10^{13}$ or more | $2 \times 10^8$ |
| | Adhesion | X | ← | ← | ← |

The specimen which did not change before and after the test was denoted "no change", and when it changed, a nemerical value measured after the test was indicated.

EXAMPLE 13

Into a hydrogen type ion exchange resin column was passed through at a space velocity of SV=5, 2000 g of an aqueous solution containing 5% by weight of sodium silicylate in terms of $SiO_2$ of sodium silicylate ($SiO_2$/$Na_2O=3$ moles/mole) while keeping at 15° C., whereby a non-sedimentary silica dispersion was obtained. This non-sedimentary silica dispersion as obtained was diluted with water to 2% by weight and subjected for 1 hour to centrifugal sedimentation at 250,000 G, whereupon the precipitates formed were 8% by weight based on the total amount of $SiO_2$.

A mixture comprising 50 g of the non-sedimentary silica dispersion obtained above, 50 g of the conductive sol obtained in Example 1, 20 g of NMP, 10 g of ZOC and 170 g of MeOH/BtOH (1/1 weight ratio) was thoroughly mixed to obtain a coating liquid for forming conductive coating.

EXAMPLE 14

A mixture comprising 50 g of the non-sedimentary silica dispersion obtained in Example 13, 200 g of the conductive sol obtained in Example 1, 10 g of NMP, 40 g of ZOC and 1400 g of MeOH/EtOH (1/1 weight ratio) was thoroughly mixed to obtain a coating liquid for forming conductive coating.

EXAMPLE 15

Following substantially the same procedure as described in Example 13, a coating liquid for forming conductive coating was obtained except that 10 g of the NMP and 380 g of MeOH/BuOH (1/1 weight ratio) were used.

EXAMPLE 16

A mixture comprising 50 g of the non-sedimentary silica dispersion obtained in Example 13, 220 g of the conductive sol obtained in Example 1, 110 g of NMP, 100 g of ZOC and 345 g of MeOH/EtOH (1/1 weight ratio) was throughly mixed to obtain a coating liquid for forming conductive coating.

EXAMPLE 17

A homogeneous mixture comprising 50 g of the non-sedimentary silica dispersion obtained in Example 13, 100 g of the conductive sol obtained in Example 1, 150 g of N,N-dimethylformamide and 30 g of ZOC was heated at 80° C. under reduced pressure with a rotary evaporator to distill off 135 g of water. The liquid obtained was cooled and thoroughly mixed with 405 g of MeOH/BuOH (1/1 weight ratio) to obtain a coating liquid for forming conductive coating.

EXAMPLE 18

Following substantially the same procedure as described in Example 13, a coating liquid for forming conductive coating was obtained except that in place of the NMP used in Example 13, there was used 20 g of methyl cellosolve.

EXAMPLE 19

Following substantially the same procedure as described in Example 13, a coating liquid for forming conductive coating was obtained except that in place of the NMP used in Example 13, there was used 20 g of morpholine.

COMPARATIVE EXAMPLE 5

A homogeneous mixture comprising 200 g of the non-sedimentary silica dispersion obtained in Example 13, 125 g of the conductive sol obtained in Example 1, 50 g of NMP and 10 g of ZOC was heated at 80° C. under reduced pressure with a rotary evaporator to distill off 210 g of water. The liquid obtained was cooled and thoroughly mixed with MeOH/BuOH (1/1 weight ratio) to obtain a coating liquid for forming conductive coating.

COMPARATIVE EXAMPLE 6

A mixture comprising 100 g of the non-sedimentary silica dispersion obtained in Example 13, 25 g of the conductive sol obtained in Example 1, 40 g of NMP, 20 g of ZOC and 115 g of MeOH/BuOH (1/1 weight ratio) was thoroughly mixed to obtain a coating liquid for forming conductive coating.

COMPARATIVE EXAMPLE 7

A homogeneous mixture comprising 100 g of the non-sedimentary silica dispersion obtained in Example 13, 350 g of the conductive sol obtained in Example 1, 40 g of NMP and 20 g of ZOC was heated at 80° C. under reduced pressure with a rotary evaporator to distill off 250 g of water. The liquid obtained was cooled and thoroughly mixed with 1340 g of MeOH/BuOH (1/1 weight ratio) to obtain a coating liquid for forming conductive coating.

COMPARATIVE EXAMPLE 8

A homogeneous mixture comprising 500 g of the non-sedimentary silica dispersion obtained in Example 13, 500 g of the conductive sol obtained in Example 1, 6 g of NMP and 100 g of ZOC was heated at 80° C. under reduced pressure with a rotary evaporator to distill off 900 g of water, whereupon gellation occurred.

COMPARATIVE EXAMPLE 9

A mixture comprising 100 g of the non-sedimentary silica dispersion obtained in Example 13, 100 g of the conductive sol obtained in Example 1, 25 g of NMP, 100 g of an aqueous solution containing 5% by weight of ZOC in terms of $ZrO_2$ of ZOC and 75 g of MeOH/BuOH (1/1 weight ratio) was thoroughly mixed to obtain a coating liquid for forming conductive coating.

In Table 4, the composition of liquid and ratio of components used in each of the foregoing examples and comparative examples were shown.

Using a spinner operated at a rate of 2000 rpm, coated individually on a glass plate were the coating liquids for forming conductive coatings obtained respectively in Examples 13–17 and Comparative Examples 5–7, and 9, and on an acrylic resin plate were the coating liquids for forming conductive coatings obtained in Examples 18 and 19. Respective coatings were obtained on the glass plates thus coated by drying at 110° C. for 10 minutes, followed by heating at 300° C. for 30 minutes, and on the acrylic resin plates thus coated by drying them at 110° C. for 30 minutes.

The coatings thus formed were evaluated in the same manner as in Example 1. The results obtained are shown in Tables 5 and 6, respectively.

TABLE 4

| | Composition of liquid | | | | | | |
|---|---|---|---|---|---|---|---|
| | $ZrO_2$ (g) | $SiO_2$ (g) | Conductive Colloid (g) | $H_2O$ (g) | Stabilizer (g) | Organic Solvent (g) | Total Wt. (g) |
| Example | | | | | | | |
| 13 | 2.5 | 2.5 | 10.0 | 95.0 | 20.0 | 170.0 | 300.0 |
| 14 | 10.0 | 2.5 | 40.0 | 237.5 | 10.0 | 1400.0 | 1700.0 |
| 15 | 2.5 | 2.5 | 10.0 | 95.0 | 10.0 | 380.0 | 500.0 |
| 16 | 25.0 | 2.5 | 44.0 | 298.5 | 130.0 | 345.0 | 825.0 |
| 17 | 7.5 | 2.5 | 20.0 | 15.0 | 150.0 | 405.0 | 600.0 |
| 18 | 2.5 | 2.5 | 10.0 | 95.0 | 20.0 | 170.0 | 300.0 |
| 19 | 2.5 | 2.5 | 10.0 | 95.0 | 20.0 | 170.0 | 300.0 |
| Compar. Example | | | | | | | |
| 5 | 2.5 | 10.0 | 25.0 | 87.5 | 50.0 | 1075.0 | 1250.0 |
| 6 | 5.0 | 5.0 | 5.0 | 130.0 | 40.0 | 115.0 | 300.0 |
| 7 | 5.0 | 5.0 | 70.0 | 140.0 | 40.0 | 1340.0 | 1600.0 |
| 8 | 25.0 | 25.0 | 100.0 | 50.0 | 6.0 | | |
| 9 | 5.0 | 5.0 | 20.0 | 270.0 | 25.0 | 75.0 | 400.0 |

| Ratio of components | | | | | | | |
|---|---|---|---|---|---|---|---|
| Solids content weight (Note 1) (wt %) | $SiO_2$ $ZrO_2$ (g/g) | Conductive particle $ZrO_2 + SiO_2$ (g/g) | $H_2O$ Total weight (wt/%) | $H_2O$ $ZrO_2$ (g/g) | stabilizer Total wt. (wt/%) | stabilizer Total wt. (mol/mol) | Pot life |

TABLE 4-continued

| Example | | | | | | | | |
|---|---|---|---|---|---|---|---|---|
| 13 | 5.0 | 1.00 | 2.0 | 31.7 | 38.0 | 6.7 | 3.3 | >3 months |
| 14 | 3.1 | 0.25 | 3.2 | 14.0 | 23.8 | 0.6 | 0.8 | >3 months |
| 15 | 3.0 | 1.00 | 2.0 | 19.0 | 38.0 | 2.0 | 1.6 | >3 months |
| 16 | 8.7 | 0.10 | 1.6 | 36.2 | 11.9 | 13.3 | 4.5 | >3 months |
| 17 | 5.0 | 0.33 | 2.0 | 2.5 | 2.0 | 25.0 | 20.0 | >3 months |
| 18 | 5.0 | 1.00 | 2.0 | 31.7 | 38.0 | 6.7 | 4.3 | >3 months |
| 19 | 5.0 | 1.00 | 2.0 | 31.7 | 38.0 | 6.7 | 3.7 | >3 months |
| Compar. Example | | | | | | | | |
| 5 | 3.0 | 4.0 | 2.0 | 7.0 | 135.0 | 4.0 | 2.7 | >3 months |
| 6 | 5.0 | 1.0 | 0.5 | 43.3 | 26.0 | 13.3 | 3.3 | >3 months |
| 7 | 5.0 | 1.0 | 7.0 | 8.8 | 28.0 | 2.5 | 3.3 | >3 months |
| 8 | | 1.0 | 2.0 | | 2.0 | | 0.1 | gelation |
| 9 | 7.5 | 1.0 | 2.0 | 67.5 | 54.0 | 6.3 | 2.0 | >3 months |

Note 1) Solids content ($ZrO_2$ + $SiO_2$ + Conductive tin oxide colloid) Percentage of solids: Solids weight/Total weight

TABLE 5

| Item No. | Transparency Tt (%) | H (%) | Glossiness G (%) | surface resistivity (Ω/□) | Adhesion | Hardness | Coating process |
|---|---|---|---|---|---|---|---|
| Example | | | | | | | |
| 13 | 93.2 | 2.0 | 135 | $5 \times 10^5$ | ○ | >9H | Spinner |
| 14 | 92.0 | 2.5 | 138 | $7 \times 10^6$ | ○ | >9H | Spinner |
| 15 | 93.0 | 2.0 | 133 | $8 \times 10^6$ | ○ | >9H | Spinner |
| 16 | 90.0 | 3.0 | 128 | $4 \times 10^5$ | ○ | >9H | Spinner |
| 17 | 91.5 | 2.0 | 138 | $5 \times 10^6$ | ○ | >9H | Spinner |
| 18 | 92.5 | 2.0 | 133 | $3 \times 10^7$ | ○ | 8H | Spinner |
| 19 | 92.0 | 2.5 | 136 | $4 \times 10^7$ | ○ | 8H | Spinner |
| Compr. Ex. | | | | | | | |
| 5 | 93.0 | 1.5 | 130 | $5 \times 10^6$ | ○ | >9H | Spinner |
| 6 | 92.0 | 1.5 | 138 | $5 \times 10^{11}$ | ○ | >9H | Spinner |
| 7 | 89.0 | 3.5 | 123 | $8 \times 10^7$ | X | 7H | Spinner |

Adhesion: The specimen rated ○ when its coating did not peel off, and rated X when the coating peeled off.

The specimen which did not change before and after the test was denoted "No change", and if it changed, a numerical value measured after the test was indicated.

EXAMPLE 20

Preparation of Coating Liquid for Forming Conductive Coating

A coating liquid (liquid A), which is a base liquid, was prepared by mixing 100 g of ethyl silicate 28, ethanol solution containing 28% by weight of tetraethoxysilane in terms of $SiO_2$) 112 g of ZON, 84 g of pure water and 824 g of ethanol together with stirring.

A conductive tin oxide sol (liquid B) was prepared by mixing with stirring 560 g of the conductive sol obtained in Example 1 with 1,680 g of ethanol.

The liquids A and B thus obtained were mixed together to obtain a coating liquid for forming conductive coating.

TABLE 6

| No. | Item | Aqueous ammonia | NaCl | Boiling water | Aqueous acetic acid |
|---|---|---|---|---|---|
| Example 13 | Glossiness (%) | No change | ← | ← | ← |
| | Surface resistivity (Ω/□) | No change | ← | ← | ← |
| | Adhesion | ○ | ← | ← | ← |
| Example 14 | Glossiness (%) | No change | ← | ← | ← |
| | Surface resistivity (Ω/□) | No change | ← | ← | ← |
| | Adhesion | ○ | ← | ← | ← |
| Example 15 | Glossiness (%) | No change | ← | ← | ← |
| | Surface resistivity (Ω/□) | No change | ← | ← | ← |
| | Adhesion | ○ | ← | ← | ← |
| Example 16 | Glossiness (%) | No change | ← | ← | ← |
| | Surface resistivity (Ω/□) | No change | ← | ← | ← |
| | Adhesion | ○ | ← | ← | ← |
| Example 17 | Glossiness (%) | No change | ← | ← | ← |
| | Surface resistivity (Ω/□) | No change | ← | ← | ← |
| | Adhesion | ○ | ← | ← | ← |
| Example 18 | Glossiness (%) | No change | ← | ← | ← |
| | Surface resistivity (Ω/□) | No change | ← | ← | ← |
| | Adhesion | ○ | ← | ← | ← |
| Example 19 | Glossiness (%) | No change | ← | ← | ← |
| | Surface resistivity (Ω/□) | No change | ← | ← | ← |
| | Adhesion | ○ | ← | ← | ← |
| Compar. Ex. 5 | Glossiness (%) | 95 | 110 | 108 | No change |
| | Surface resistivity (Ω/□) | $1 \times 10^{11}$ | ← | ← | No change |
| | Adhesion | X | ← | ← | ○ |
| Compar. Ex. 6 | Glossiness (%) | No change | ← | ← | ← |
| | Surface resistivity (Ω/□) | $6 \times 10^{10}$ | $9 \times 10^9$ | $6 \times 10^{11}$ | $3 \times 10^{11}$ |
| | Adhesion | ○ | ← | ← | ← |
| Compar. Ex. 7 | Glossiness (%) | Peeled off | Peeled off | Peeled off | No change |
| | Surface resistivity (Ω/□) | $10^{13}$ or more | $10^{13}$ or more | $10^{13}$ or more | $5 \times 10^8$ |
| | Adhesion | X | ← | ← | ← |

EXAMPLE 21

Following substantially the same procedure as described in Example 20, a coating liquid for forming conductive coating was obtained except that the liquids A and B used in Example 20 were replaced by those which contained 50 g of ethyl silicate 40, ethanol solution containing 40% by weight of tetraethoxysilane in terms of $SiO_2$) 10 g of ZOC, 688.5 g of a methanol-butanol mixture (weight ratio=1:1) and 1.5 g of pure water, and which contained 562.5 g of the conductive sol obtained in Example 1 and 3,187.5 g of a methanol-butanol mixture, respectively.

EXAMPLE 22

Following substantially the same procedure as described in Example 20, a coating liquid for forming conductive coating was obtained except that the liquids A and B used in Example 20 were replaced by those which contained 30 g of ethyl silicate 28, 55 g of ZON, and 137 g of a methyl cellosolve-ethyl acetate mixture (weight ratio =1:1), and which contained 66.6 g of the conductive sol and 66.4 g of a methyl cellosolve-ethyl acetate mixture, respectively.

EXAMPLE 23

Preparation of Conductive Tin Oxide Dispersion

The powder (I) obtained in Example 1 was dispersed in pure water, and the dispersion was treated for 3 hours to obtain an a dispersion of conductive tin oxide having an average particle diameter of 0.2 μm, said dispersion having a solids concentration of 20% by weight.

Preparation of Coating Liquid for Forming Conductive Coating

A mixture (liquid C) comprising 50 g of ethyl silicate 28, 137.8 g of ZOC, 16.8 g of pure water and 763.4 g of ethanol was prepared.

A mixture (liquid D) comprising 484 g of the conductive tin oxide dispersion obtained above and 1936 g of ethanol was prepared.

The liquid C and liquid D were mixed together with stirring to obtain a coating liquid for forming conductive coating.

EXAMPLE 24

Preparation of Conductive Indium Oxide Dispersion

The fine powder (II) obtained in Example 12 was dispersed in methyl cellosolve, and the dispersion was treated for 3 hours with a sand mill to obtain a methyl cellosolve dispersion of conductive indium oxide having an average particle diameter of 0.3 μm, said dispersion having a solids concentration of 30% by weight.

Preparation of Coating Liquid for Forming Conductive Coating

A mixture comprising 50 g of ethyl silicate 40, 295 g of ZON, 48 g of pure water and 2733.5 g of methyl cellosolve was prepared. The above-mentioned conductive indium oxide dispersion was further mixed thoroughly with 8842 g of methyl cellosolve, and then the mixture was mixed with stirring with the above-mentioned mixture to obtain a coating liquid for forming conductive coating.

EXAMPLE 25

Preparation of Non-Sedimentary Silica Dispersion

To the non-sedimentary silica dispersion obtained in Example 13 was added and mixed therewith 44.5 g, based on 100 g of the non-sedimentary silica dispersion, of NMP as a stabilizer, and the mixture was then heated at 80° C. with a rotary evaporator to distill off the greater part of water, whereby a stabilized non-sedimentary silica dispersion (liquid E) was obtained. This liquid had the $SiO_2$ concentration of 10% by weight and the water content of 1.0% by weight.

Preparation of Coating Liquid for Forming Conductive Coating

A mixture (liquid F) comprising 100 g of ethyl silicate 28, 112 g of ZON, 939 g of ethanol, 84 g of pure water and 31 g of the above-mentioned liquid E.

Separately, a mixture (liquid G) comprising 591 g of the conductive sol obtained in Example 1 and 1773 g of ethanol was prepared.

The liquids F and C were mixed together with stirring to obtain a coating liquid for forming conductive coating.

EXAMPLE 26

Following substantially the same procedure as described in Example 25, a coating liquid for forming conductive coating was obtained except that of the components of the liquid F, the ethanol used was 1104 g and the liquid E used was 280 g, and of the components of the liquid G, the conductive sol used was 840 g and the ethanol used was 3192 g.

EXAMPLE 27

Following substantially the same procedure as described in Example 25, a coating liquid for forming conductive coating was obtained except that of the components of the liquid F, the ethanol used was 3344 g and the liquid E used was 2520 g, and of the components of the liquid G, the conductive sol used was 3080 g and the ethanol used was 9240 g.

Properties of the coating liquids for forming conductive coatings obtained in the foregoing examples are shown in Table 7.

TABLE 7

| Example | $ZrO_2/SiO_2$ (Molar ratio) | $MO_x/$ $(ZrO_2 + SiO_2)$ (weight ratio) | Solids conc. (wt %) | $SiO_2/SiO_2$ (weight ratio) | pH | Pot life |
|---|---|---|---|---|---|---|
| 20 | 0.49 | 2.0 | 5.0 | — | 1.5 | 3 months or more |
| 21 | 0.06 | 5.0 | 3.0 | — | 1.9 | 3 months or more |
| 22 | 0.80 | 0.6 | 10.0 | — | 1.4 | 3 months or more |
| 23 | 1.20 | 2.0 | 5.0 | — | 1.2 | 3 months or more |
| 24 | 1.80 | 3.0 | 3.0 | — | 1.1 | 3 months or more |
| 25 | 0.44 | 2.0 | 5.0 | 1/9 | 1.6 | 3 months or more |
| 26 | 0.24 | 2.0 | 5.0 | 1/1 | 1.8 | 3 months or more |

TABLE 7-continued

| Example | ZrO$_2$/SiO$_2$ (Molar ratio) | MO$_x$/ (ZrO$_2$ + SiO$_2$) (weight ratio) | Solids conc. (wt %) | SiO$_2$/SiO$_2$ (weight ratio) | pH | Pot life |
|---|---|---|---|---|---|---|
| 27 | 0.05 | 2.0 | 5.0 | 9/1 | 1.9 | 3 months or more |

MO$_x$: Conductive substance
Solids conc.: MO$_x$ + ZrO$_2$ + SiO$_2$
SiO$_2$/SiO$_2$: (SiO$_2$ of non-sedimentary/(SiO$_2$ of silicon alkoxide) sillica)

The conductive coating liquids obtained respectively in Examples 20-27 were individually coated on glass plates using a spinner at a rate of 2000 rpm, and the glass plates thus coated were dried at 110° C. and then heated at 250° C. to form their respective conductive coatings thereon.

The coatings thus obtained were evaluated in the same manner as in Example 1. The results obtained are shown in Table 8.

In the permanence property test, the sample was immersed in an aqueous ammonia and in an aqueous solution of NaCl, as in Example 1, and evaluated for total light transmittance (t$_t$) and adhesion of the coating to the glass plate.

TABLE 8

| Example | Tt (%) | G (%) | H (%) | Surface resistivity (Ω/□) | Adhesion | Hardness | Permanence property test Tt | Adhesion |
|---|---|---|---|---|---|---|---|---|
| 20 | 91.5 | 150 | 1.5 | 8 × 10$^5$ | Accepted | >9H | No change | Accepted |
| 21 | 92.0 | 145 | 1.1 | 3 × 10$^6$ | Accepted | >9H | No change | Accepted |
| 22 | 91.0 | 156 | 1.6 | 2 × 10$^8$ | Accepted | >9H | No change | Accepted |
| 23 | 88.0 | 110 | 8.0 | 1 × 10$^7$ | Accepted | 8H | No change | Accepted |
| 24 | 89.5 | 100 | 7.5 | 2 × 10$^4$ | Accepted | 8H | No change | Accepted |
| 25 | 91.8 | 146 | 1.3 | 7 × 10$^5$ | Accepted | >9H | No change | Accepted |
| 26 | 92.5 | 140 | 1.1 | 5 × 10$^5$ | Accepted | >9H | No change | Accepted |
| 27 | 93.2 | 131 | 1.1 | 5 × 10$^5$ | Accepted | >9H | No change | Accepted |

EXAMPLE 28

Preparation of Partial Hydrolysate of Silicon Alkoxide

Liquid H

To 100 g of ethyl silicate-28 was added with stirring 110 g of ethanol and then added 70 g of an aqueous solution of 5% by weight of nitric acid. The mixture was then heated at 60° C. and kept at that temperature for 1 hour.

Liquid I

To 100 g of ethyl silicate-40 was added with stirring 200 g of ethanol and then added 100 g of an aqueous solution of 1.0% by weight of acetic acid. The mixture was then heated at 40° C. and kept at that temperature for 30 minutes.

Preparation of Conductive Substance

Liquid C

In 100 g of water was dispersed 20 g of the fine powder (I) obtained in Example 1 and pulverized for 3 hours with a sand mill to obtain a conductive tin oxide dispersion having an average particle diameter of 0.3 μm.

Liquid K

The conductive sol obtained in Example 1 was used as liquid K.

Liquid L

In 100 g of water was dispersed 20 g of the fine powder (II) obtained in Example 12 and pulverized for 3 hours with a sand mill to obtain a conductive indium oxide dispersion having an average particle diameter of 0.3 μm.

Subsequently, to 100 g of the liquid K obtained above was added 11.9 g of ethanol and further added with stirring 3.1 g of 13% by weight of diacetylacetonatodibutoxy zirconium (ABZ). To the mixture was added 70 g of the liquid H and thoroughly dispersed to obtain a coating liquid for forming conductive coating.

EXAMPLES 29-33 AND COMPARATIVE EXAMPLE 10

Substantially the same procedure as described in Example 28 was followed except for a change in composition of the coating liquid used in each example as shown in Table 9.

COMPARATIVE EXAMPLE 11

To a mixture comprising 100 g of the liquid K and 11.9 g of ethanol was added with stirring 70 g of the liquid H. In the mixture was then dispersed 3.1 g of 13% by weight of ABZ, whereupon aggregation of colloidal particles took place several minutes after dispersing and the aggregated particles precipitated.

COMPARATIVE EXAMPLE 12

To 35.7 g of ethyl silicate 28 was added with stirring 447.3 g of ethanol followed by further addition of 4 g of ZON and 22 g of water. In the mixture was thoroughly dispersed 100 g of the liquid K.

The coating liquids thus obtained were individually coated on substrates as shown in Table 10 by the spinner or roll coater method to form their respective coatings thereon.

Evaluation of the coatings thus formed was conducted in the same manner as in Example 1.

In this connection, scratch resistance was measured in the following manner.

That is, an eraser for office use (equivalent to No. 50-50, a product of LION K.K.) was placed on the coating formed on PC (a polycarbonate plate) or glass plate fixed onto a platform scale, and said coating was rubbed 300 times with the eraser under a load of 2 kg to measure total light transmittance and surface resistivity.

The results obtained are shown in Table 10.

In the test for alkali resistance, the sample was immersed in 15% by weight aqueous ammonia at room temperature for a week, and thereafter adhesion of the coating to the substrate and surface resistivity of the coating were measured.

used, and the plate was dried at 110° C. for 30 minutes without subjecting it to subsequent heating.

TABLE 9

| | $MO_x$ (g) | Solvent (g) | AAZ (g) | Silicon alkoxide (g) | Solids concn. (wt %) | $\dfrac{ZrO_2}{MO_x}$ (wt/wt) | $\dfrac{ZrO_2}{SiO_2}$ (wt/wt) | $\dfrac{MO_x}{SiO_2 + ZrO_2}$ (wt/wt) | Average particle diam. in coating liquid (μm) | Pot life at 30° C. |
|---|---|---|---|---|---|---|---|---|---|---|
| Example | | | | | | | | | | |
| 28 | liquid D 100 | EtOH 11.9 | ABZ 3.1 | liquid A 100 | 14.8 | 0.02 | 0.057 | 2.7 | 0.07 | >3 months |
| 29 | liquid D 100 | EtOH 402.9 | ABZ 6.9 | liquid A 100 | 5.1 | 0.45 | 0.09 | 1.8 | 0.07 | >6 months |
| 30 | liquid D 100 | BuOH/MeOH 2265 | ABZ 15.4 | liquid B 20 | 1.0 | 0.1 | 1.0 | 5.0 | 0.07 | >6 months |
| 31 | liquid D 100 | EtOH/methycello 296.2 | ABZ 153.8 | liquid A 200 | 8.0 | 1.0 | 1.0 | 0.5 | 0.07 | >6 months |
| 32 | liquid C 100 | EtOH 402.9 | ABZ 6.9 | liquid A 100 | 5.1 | 0.45 | 0.09 | 1.8 | 0.3 | >6 months |
| 33 | liquid E 100 | EtOH 402.9 | ABZ 6.9 | liquid A 100 | 5.1 | 0.45 | 0.09 | 1.8 | 0.3 | >6 months |
| Compar. Example | | | | | | | | | | |
| 10 | liquid D 100 | EtOH 769.2 | ABZ 230.8 | liquid A 100 | 5.0 | 1.5 | 3.0 | 0.5 | 0.07 | >3 months |
| 11 | liquid D 100 | EtOH 11.9 | ABZ 3.1 | liquid A 100 | 14.8 | 0.02 | 0.057 | 2.7 | — | Aggregated |
| 12 | liquid D 100 | EtOH 447.3 H₂O 22 | zirco nitrate 4.0 | ES-28 35.7 | 5.1 | 0.05 | 0.1 | 1.8 | 0.16 | 7 days |

1. AAZ = Diacetylacetonate-dialkoxy zirconium
2. ABZ = Diacetylacetonate-dibutoxy zirconium
3. Methycello = Methyl cellosolve
4. Zirco nitrate = Zirconium nitrate
5. ES-28 = Ethyl silicate-28

TABLE 10

| | Coating process | Substrate | Firing temp. (°C.) | Rs (Ω/□) | Tt (%) | H (%) | G (%) | Adhesion | Scratch resistance Tt (%) | Scratch resistance Rs (Ω/□) | Alkali resistance Adhesion | Alkali resistance Rs (Ω/□) |
|---|---|---|---|---|---|---|---|---|---|---|---|---|
| Example | | | | | | | | | | | | |
| 28 | Spinner | PC | 150 | 2 × 10⁶ | 90.2 | 1.2 | 154 | ○ | 90.2 | 2 × 10⁶ | ○ | 2 × 10⁶ |
| 29 | Roll coater | glass | 150 | 1 × 10⁷ | 90.8 | 0.9 | 153 | ○ | 90.5 | 1 × 10⁷ | ○ | 1 × 10⁷ |
| 29 | Roll coater | glass | 200 | 5 × 10⁶ | 90.5 | 0.9 | 152 | ○ | 90.2 | 5 × 10⁶ | ○ | 5 × 10⁶ |
| 29 | Roll coater | glass | 450 | 5 × 10⁶ | 90.0 | 0.9 | 156 | ○ | 90.0 | 5 × 10⁶ | ○ | 5 × 10⁶ |
| 30 | Roll coater | glass | 250 | 3 × 10⁹ | 92.5 | 2.5 | 148 | ○ | 92.3 | 3 × 10⁹ | ○ | 3 × 10⁹ |
| 31 | Roll coater | glass | 400 | 5 × 10⁸ | 90.6 | 1.0 | 156 | ○ | 91.8 | 5 × 10⁸ | ○ | 5 × 10⁸ |
| 32 | Roll coater | glass | 200 | 5 × 10⁶ | 92.1 | 4.0 | 128 | ○ | 91.8 | 6 × 10⁶ | ○ | 5 × 10⁶ |
| 33 | Roll coater | glass | 200 | 3 × 10³ | 90.5 | 5.1 | 131 | ○ | 90.1 | 6 × 10³ | ○ | 3 × 10³ |
| Compar. Example | | | | | | | | | | | | |
| 10 | Roll coater | glass | 200 | 1 × 10¹² | Blushed | Blushed | Blushed | X | — | — | — | — |
| 12 | Spinner | glass | 150 | 8 × 10⁶ | 90.7 | 1.1 | 143 | ○ | 90.2 | 3 × 10⁸ | X | 2 × 10⁹ |
| 12 | Spinner | glass | 300 | 6 × 10⁶ | 90.4 | 1.3 | 147 | ○ | 90.1 | 6 × 10⁶ | ○ | 6 × 10⁶ |
| 12 | Roll coater | glass | 150 | 1 × 10¹⁰ | 90.8 | 2.8 | 126 | ○ | 91.0 | 1 × 10¹⁰ | X | 1 × 10¹⁰ |
| 12 | Roll coater | glass | 300 | 5 × 10⁹ | 90.4 | 3.0 | 130 | ○ | 91.0 | 5 × 10⁹ | ○ | 5 × 10⁹ |
| 12 | Roll coater | glass | 450 | 1 × 10⁹ | 90.0 | 3.0 | 135 | ○ | 90.7 | 1 × 10⁹ | ○ | 1 × 10⁹ |

PC = a polycarbonate plate, Glass = a glass plate, and the number of rotation of the spinner is 2000 rpm. Rs = surface resistivity.

EXAMPLE 34

A panel for 14-inch Braun tube kept at 60° C. was spray coated under a spray pressure of 3.0 kg/cm² with 20 ml of the coating liquid for forming conductive coating obtained in Example 13. Thereafter, the panel thus coated was dried at 110° C. and then heated at 450° C. for 30 minutes.

EXAMPLE 35

Example 34 was repeated except that the panel for 14-inch Braun tube was kept at 70° C.

EXAMPLE 36

Example 34 was repeated except that in place of the panel for 14-inch Braun tube, an acrylic resin plate was

EXAMPLE 37

A panel spray coated with the coating liquid for forming conductive coating and dried at 110° C. for 30 minutes in example 34, was kept at 60° C., and the panel was then spray coated under a spray pressure of 3.0 kg/cm² with 20 ml of a coating liquid containing transparent protective components, which coating liquid had been obtained by homogeneously mixing together 100 g of ethyl silicate 28 (a product of Tama Kagaku K.K.), 749 g of isopropanol, 84 g of water and 0.5 g of 35% by weight of hydrochloric acid. Thereafter, the panel thus coated was dried at 110° C. for 10 minutes and then heated at 450° C. for 30 minutes.

EXAMPLE 38

A homogeneous mixture comprising 50 g of the non-sedimentary silica dispersion obtained in Example 13 and 43 g of NMP was heated at 80° C. to distill off 93 g of water. The mixture obtained was cooled and mixed with 120 g of ethanol to obtain a coating liquid containing transparent protective components.

The panel obtained in Example 34 was kept at 60° C. and spray coated under a spray pressure of 3.0 kg/cm$^2$ with 20 ml of the coating liquid containing transparent protective components obtained above. Thereafter, the panel thus coated was dried at 110° C. for 10 minutes and then heated at 250° C. for 30 minutes.

EXAMPLE 39

A coating liquid containing transparent protective components was obtained by mixing 10 g of 50% by weight of silicone resin (a xylene-diluted product of Kanegafuchi Kagaku Industry Co., Ltd. under a trade name of Cemlack) with 157 g of methyl ethyl ketone.

The panel obtained in Example 34 was kept at 60° C. and spray coated under a spray pressure of 3.0 kg/cm$^2$ with 20 ml of the coating liquid containing transparent protective components obtained above. Thereafter, the panel thus coated was dried at 110° C. for 10 minutes.

COMPARATIVE EXAMPLE 13

Example 34 was repeated except that the panel for 14-inch Braun tube was kept at 110° C.

COMPARATIVE EXAMPLE 14

Example 34 was repeated except that the coating liquid for forming conductive coating obtained by thoroughly mixing together 100 g of the non-sedimentary silica dispersion obtained in Example 13, 50 g of the conductive sol obtained in Example 1, 25 g of NMP and 125 g of ethanol was used. That is no oxysalt of zirconium was used.

COMPARATIVE EXAMPLE 15

With the purpose of preparing a coating liquid for forming conductive coating, 100 g of the non-sedimentary silica dispersion obtained in Example 13, 100 g of the conductive sol obtained in Example 1, 20 g of ZON and 380 g of MeOH/EtOH (1/1 weight ratio) were thoroughly mixed together, whereupon gellation occurred 30 minutes thereafter. (No stabilizer was used.)

COMPARATIVE EXAMPLE 16

In the coating liquid for forming conductive coating obtained in Example 13 was immersed a glass plate (200×200×3 mm), and the plate was then pulled up therefrom at a rate of 5 cm/min. Thereafter, the plate thus treated was dried at 110° C. for 30 minutes and then heated at 450° C. for 30 minutes.

Evaluation of the foregoing examples and comparative examples was conducted in the same manner as in Example 1.

The resolving power was measured by the method as described in the present specification. Rz was measured in accordance with the method of measurement of Rz stipulated in JIS B0601-82 using a Talystep sensor (manufactured and sold by Rank Tyler Hobson Co.).

Evaluation of the coating film strength was conducted in the following manner. That is, an eraser for office use (equivalent to No. 50-50, a product of LION K.K.) was placed on the coating of the panel or acrylic resin plate fixed onto a platform scale and said coating was rubbed with the eraser under a load of 2 kg until the surface of said panel or acrylic resin plate is exposed, and the number of times of reciprocating movements of the eraser required for was sought, on the basis of which the coating film strength was determined.

In addition to the Example 1 of the test for permanence properties described previously in the present specification, the test for permanence properties conducted herein included 5) immersion of the plate in acetone at room temperature for 1 week, 6) immersion of the plate in ethanol at room temperature for 1 week, and 7) immersion of the plate in n-propanol at room temperature for 1 week.

The results obtained are shown in Tables 11 and 12, respectively.

TABLE 11

| Item No. | Resolving power (Bar/cm) | Glossiness G (%) | Surface resistivity (Ω/□) | Adhesion | Film strength (No. of times) | Average roughness Rz (μm) |
| --- | --- | --- | --- | --- | --- | --- |
| Example |  |  |  |  |  |  |
| 34 | 65 | 62 | 8 × 10$^6$ | ○ | 100 | 0.95 |
| 35 | 65 | 63 | 7 × 10$^6$ | ○ | 100 | 0.98 |
| 36 | 65 | 60 | 8 × 10$^7$ | ○ | 50 | 1.10 |
| 37 | 70 | 54 | 9 × 10$^6$ | ○ | 300 | 1.55 |
| 38 | 70 | 53 | 8 × 10$^6$ | ○ | 200 | 1.63 |
| 39 | 65 | 57 | 2 × 10$^7$ | ○ | 150 | 1.48 |
| Compar. Ex. |  |  |  |  |  |  |
| 13 | 20 | 20 | 5 × 10$^6$ | X | <25 | 6.20 |
| 14 | 65 | 60 | 5 × 10$^6$ | ○ | 150 | 1.20 |
| 15 | — | — | — | — | — | — |
| 16 | 75 | 142 | 2 × 10$^6$ | ○ | 250 | 0.10 |

Notes: In Comparative Example 15, the coating liquid for forming conductive coating gelled and no coating was formed.

TABLE 12

| | Aqueous ammonia | NaCl | Boiling water | Aqueous acetic acid | Acetone | Ethanol | n-Propanol |
| --- | --- | --- | --- | --- | --- | --- | --- |
| Example |  |  |  |  |  |  |  |
| 34 |  |  |  |  |  |  |  |

TABLE 12-continued

| | Aqueous ammonia | NaCl | Boiling water | Aqueous acetic acid | Acetone | Ethanol | n-Propanol |
|---|---|---|---|---|---|---|---|
| Glossiness (%) | 60 | 61 | 62 | 60 | 61 | 61 | 61 |
| Surface (Ω/□) resistivity | No change | ← | ← | ← | ← | ← | ← |
| Adhesion | ○ | ← | ← | ← | ← | ← | ← |
| 35 | | | | | | | |
| Glossiness (%) | 60 | 62 | 63 | 61 | 62 | 61 | 62 |
| Surface (Ω/□) resistivity | No change | ← | ← | ← | ← | ← | ← |
| Adhesion | ○ | ← | ← | ← | ← | ← | ← |
| 36 | | | | | | | |
| Glossiness (%) | 57 | 59 | 58 | 56 | 59 | 59 | 59 |
| Surface (Ω/□) resistivity | No change | ← | ← | ← | ← | ← | ← |
| Adhesion | ○ | ← | ← | ← | ← | ← | ← |
| 37 | | | | | | | |
| Glossiness (%) | 53 | 54 | 54 | 53 | 54 | 54 | 54 |
| Surface (Ω/□) resistivity | No change | ← | ← | ← | ← | ← | ← |
| Adhesion | ○ | ← | ← | ← | ← | ← | ← |
| 38 | | | | | | | |
| Glossiness (%) | 51 | 52 | 50 | 54 | 53 | 53 | 53 |
| Surface (Ω/□) resistivity | No change | ← | ← | ← | ← | ← | ← |
| Adhesion | ○ | ← | ← | ← | ← | ← | ← |
| 39 | | | | | | | |
| Glossiness (%) | 55 | 56 | 55 | 57 | 57 | 57 | 57 |
| Surface (Ω/□) resistivity | No change | ← | ← | ← | ← | ← | ← |
| Adhesion | ○ | ← | ← | ← | ← | ← | ← |
| Compar. Example | | | | | | | |
| 13 | | | | | | | |
| Glossiness (%) | Peeled off | ← | ← | ← | ← | ← | ← |
| Surface (Ω/□) resistivity | peeled off | ← | ← | ← | ← | ← | ← |
| Adhesion | peeled off | ← | ← | ← | ← | ← | ← |
| 14 | | | | | | | |
| Glossiness (%) | Peeled off | 170 | 85 | 60 | 60 | 60 | 60 |
| Surface (Ω/□) resistivity | peeled off | 9 × 10$^{13}$ | 5 × 10$^8$ | No change | ← | ← | ← |
| Adhesion | peeled off | X | X | ○ | ← | ← | ← |
| 16 | | | | | | | |
| Glossiness (%) | 140 | 141 | 142 | 140 | 141 | 141 | 141 |
| Surface (Ω/□) resistivity | No change | ← | ← | ← | ← | ← | ← |
| Adhesion | ○ | ← | ← | ← | ← | ← | ← |

COMMERCIAL POSSIBILITY OF THE INVENTION

Glass or plastic substrates provided with transparent conductive coating formed by the use of the coating liquid for forming conductive coatings of the present invention are utilizable in the field of the articles of manufacture where antistatic function and non-glare are required, such as face-plates for display devices such as CRT or LCD, glass plates for copy machines, panels for instruments, glass for clean rooms, transparent digitizers, telewriting terminals and the like.

What is claimed is:

1. A coating liquid for forming a conductive coating which comprises a binder substance and a conductive substance dissolved or dispersed homogeneously in a mixed solvent of water and an organic solvent wherein said conductive substance is selected from the group consisting of tin oxide, tin oxide doped with antimony, flouorine or phosphorus, indium oxide, and indium oxide doped with tin or fluorine; said binder substance comprises (1) a zirconium oxysalt selected from the group consisting of zirconium oxychloride, zirconium oxynitrate, zirconium oxyacetate and zirconium, and (2) a silicon alkoxide compound represented by $SiH_a(OR)_b$ wherein a is an integer of from 0 to 3, b is an integer of from 1 to 4 with the proviso that a+b is 4, and R is alkyl having from 1 to 8 carbon atoms, or $(R'O)_aSi(OR)_b$ wherein a is an integer of from 1 to 3, b is an integer of from 1 to 3 with the proviso that a+b is 4, and R and R', each is alkyl having from 1 to 8 carbon atoms, or $R'_aSi(OR)_b$ wherein a is an integer of from 1 to 3, b is an integer of from 1 to 3 with the proviso that a+b is 4, and R and R', each is alkyl having from 1 to 8 carbon atoms, and wherein a part of H is said silicon alkoxide compound may be substituted by Cl or vinyl, or a condensate of up to 5 molecules of such a silicon alkoxide compound;

the ratio of the number of moles of the zirconium oxysalt in terms of $ZrO_2$ to the number of moles of the silicon alkoxide in terms $SiO_2$ is in the range of 0.05 to 2.0; and the weight ratio of the conductive substance in terms of oxide to the sum total of the zirconium oxysalt in terms of $ZrO_2$ and silicon alkoxide in terms of $SiO_2$ is in the range of 0.5-5.

2. A coating liquid for forming a conductive coating which comprises a binder substance and a conductive substance dissolved or dispersed homogeneously in a mixed solvent of water and an organic solvent wherein
said conductive substance is selected from the group consisting of tin oxide, tin oxide doped with antimony, fluorine or phosphorus, indium oxide, and indium oxide doped with tin or fluorine;
said binder substance comprises
(4) diacetylacetonato-dialkoxy zirconium in which the alkoxy groups have from 1 to 8 carbon atoms and
(5) a partial hydrolysate of a silicon alkoxide compound represented by $SiH_a(OR)_b$ wherein a is an integer of from 0 to 3, b is an integer of from 1 to 4 with the proviso that a+b is 4, and R is alkyl having from 1 to 8 carbon atoms, or $(R'O)_aSi(OR)_b$ wherein a is an integer of from 1 to 3, is an integer of from 1 to 4 with the proviso that a+ b is 4, and R is alkyl having from 1 to 8 carbon atoms, or $(R'O)_aSi(OR)_b$ wherein a is an integer of from 1 to 3, b is an integer of from 1 to 3 with the proviso that a+b is 4, and R and R', each is alkyl having from 1 to 8 carbon atoms, or $R'_aSi(OR)_b$ wherein a is an integer of from 1 to 3, b is an integer of from 1 to 3 with the proviso that a+b is 4, and R and R', each is alkyl having from 1 to 8 carbon atoms, and wherein a part of H in said silicon alkoxide compound may be substituted by Cl or vinyl;
the weight ratio of the diacetylacetonato-dialkoxy zirconium in terms of $ZrO_2$ to the silicon alkoxide in terms of $SiO_2$ is in the range of 0.05 to 1; and
the weight ratio of the conductive substance in terms of oxide to the sum total of the diacetylacetonato-dialkoxy zirconium in terms of $ZrO_2$ and silicon alkoxide in terms of $SiO_2$ is in the range of 0.5–5.

3. A coating liquid for forming a conductive coating which comprises a binder substance, a conductive substance and a stabilizer dissolved or dispersed homogeneously in a mixed solvent of water and an organic solvent wherein said conductive substance is selected from the group consisting of tin oxide, tin oxide doped with antimony, fluorine or phosphorus, indium oxide, and indium oxide doped with tin or fluorine;
said binder substance comprises a zirconium oxysalt selected from the group consisting of zirconium oxychloride, zirconium oxynitrate, zirconium oxyacetate and zirconium oxyoxalate;
said stabilizer is selected from the group consisting of ethlene glycol, N-methyl-2-pyrrolidone, morpoline, ethyl cellosolve, methyl cellosolve and N,N-dimetyl-formamide;
the weight ratio of the water to the zirconium oxysalt in terms of $ZrO_2$ falls within the range of 0.1–40;
the weight ratio of the conductive substance to the zirconium oxysalt in terms of $ZrO_2$ is 1–5; and
the molar ratio of the stabilizer to the zirconium oxysalt in terms of $ZrO_2$ is 1–25.

4. A coating liquid for forming a conductive coating which comprises a binder substance, a conductive substance and stabilizer dissolved or dispersed homogeneously in mixed solvent of water and an organic solvent wherein
said conductive substance is selected from the group consisting of tin oxide, tin oxide doped with antimony, fluorine or phosphorus, indium oxide, and indium oxide doped with tin or fluorine;
said binder substance comprises
(1) a zirconium oxysalt selected from the group consisting of zirconium oxychloride, zirconium oxynitrate, zirconium oxyacetate and zirconium oxyoxalate, and
(2) a non-sedimentary silica capable of giving a sediment of less than 30% by weight of the total amount of $SiO_2$ when an aqueous dispersion containing 2.0% by weight of said non-sedimentary silica in terms of $SiO_2$ is subject to centrifugal sedimentation at 250,000 G for 1 hour;
said stabilizer is selected from the group consisting of ethylene glycol, N-methyl-2-pyrrolidone, morpholine, ethyl cellosolve, methyl cellosolbe and N,N-dimetyl-formamide;
the weight ratio of the water to the zirconium oxysalt in terms of $ZrO_2$ falls within the range of 1.0–40;
the weight ratio of the conductive substance to the sum total of the zirconium oxysalt in terms of $ZrO_2$ and $SiO_2$ present in the non-sedimentary silica is 1–5; and
the ratio of the number of moles of the stabilizer to the number of the sum total of moles of the zirconium oxysalt in terms of $ZrO_2$ and $SiO_2$ present in the non-sedimentary silica is 1–25.

5. A coating liquid for forming a conductive coating which comprises a binder substance, a conductive substance and stabilizer dissolved or dispersed honogeneously in a mixed solvent of water and an organic solvent wherein
said conductive substance is selected from the group consisting of tin oxide, tin oxide doped with antimony, fluorine or phosphorous, indium oxide, and indium oxide doped with tin or fluorine;
said binder substance comprises
(1) a zirconium oxysalt selected from the group consisting of zirconium oxychloride, zirconium oxynitrate, zirconium oxyacetate and zirconium oxyoxalate, and
(2) a non-sedimentary silica capable of giving a sediment of less than 30% by weight of the total amount of $SiO_2$ when an aqueous dispersion containing 2.0% by weight of said non-sedimentary silica in terms of $SiO_2$ is subjected to centrifugal sedimentation at 250,000 G for 1 hour; and
(3) a silicon alkoxide compound represented by $SiH_a(OR)_b$ wherein a is an integer of from 0 to 3, b is an integer of from 1 to 4 with the proviso that a+b is 4, and R is alkyl having from 1 to 8 carbon atoms, or $(P'O)_aSi(OR)_b$ wherein a is an integer of from 1, b is an integer of from 1 to 3 with the proviso that a+b is 4, and R and R', each is alkyl having from 1 to 8 carbon atoms or $R'_aSi(OR)_b$ and wherein a part of H in said silicon alkoxide compound may be substituted by Cl or vinyl, or a condensate of up to 5 molecules of such a slilcon alkoxide compound;
said stabilizer is selected from the group consisting of ethylene glycol, N-methyl-2-pyrrolidone, morpholine, ethyl cellosolve, methyl cellosolve and N,N-dimethyl-formamide;
the ratio of the number of moles of the zirconium oxysalt in terms of $ZrO_2$ to the sum total of the number of moles of the silicon alkoxide in terms of $SiO_2$ and the number of moles of $SiO_2$ present in the non-sedimentary silica is in the range 0.05 to 2.0;
the weight ratio of the conductive substance in terms of oxide to the sum total of the weight of the zirconium oxysalt in terms of $ZrO_2$ and silicon alkoxide in terms of $SiO_2$ is in the range of 0.5–5; and
the ratio of the number of moles of the stabilizer to the number of the sum total of moles of the zirconium oxysalt in terms of $ZrO_2$ and $SiO_2$ present in the non-sedimentary silica is 1–25.

* * * * *